United States Patent
Nakamura et al.

(10) Patent No.: US 12,487,392 B2
(45) Date of Patent: Dec. 2, 2025

(54) LIGHT INCOUPLING ELEMENT, RELATED METHOD AND USES

(71) Applicant: NITTO DENKO CORPORATION, Osaka (JP)

(72) Inventors: Kozo Nakamura, Osaka (JP); Minoru Miyatake, Osaka (JP); Yufeng Weng, Osaka (JP); Kari Rinko, Helsinki (FI); Shingo Matsumoto, Tokyo (JP)

(73) Assignee: NITTO DENKO CORPORATION, Osaka (JP)

( * ) Notice: Subject to any disclaimer, the term of this patent is extended or adjusted under 35 U.S.C. 154(b) by 292 days.

(21) Appl. No.: 18/019,301

(22) PCT Filed: Aug. 4, 2021

(86) PCT No.: PCT/JP2021/028955
§ 371 (c)(1),
(2) Date: Feb. 2, 2023

(87) PCT Pub. No.: WO2022/030544
PCT Pub. Date: Feb. 10, 2022

(65) Prior Publication Data
US 2023/0273363 A1  Aug. 31, 2023

(30) Foreign Application Priority Data
Aug. 6, 2020 (JP) .................. 2020-134108

(51) Int. Cl.
F21V 8/00 (2006.01)
(52) U.S. Cl.
CPC .................. *G02B 6/0031* (2013.01)
(58) Field of Classification Search
None
See application file for complete search history.

(56) References Cited

U.S. PATENT DOCUMENTS

| 7,798,696 B2 * | 9/2010 | Lee | G02B 6/0018 |
| | | | 362/609 |
| 8,002,450 B2 * | 8/2011 | Van Ostrand | G02B 6/0028 |
| | | | 362/617 |

(Continued)

FOREIGN PATENT DOCUMENTS

| CN | 202813209 | 3/2013 |
| CN | 111295606 | 6/2020 |

(Continued)

OTHER PUBLICATIONS

Carlos Angulo Barrios et al., "Light coupling in a Scotch tape waveguide via an integrated metal diffraction grating", Opt. Lett. 41, 2016, pp. 301-304.

(Continued)

*Primary Examiner* — Jerry Rahll
(74) *Attorney, Agent, or Firm* — GREENBLUM & BERNSTEIN, P.L.C.

(57) ABSTRACT

An optical incoupling element (100) provided in the form of a discrete item attachable on a lightguide (20) is provided, comprising a substrate (100A) and at least one three-dimensionally formed optical surface (104). The optical surface (104) is configured to incouple light incident thereto and to adjust direction of the incoupled light transmitted through an optical contact surface (107) established at an interface between the element substrate (100A) and a lightguide medium (20) such, that the incoupled light acquires a propagation path through a lightguide medium (20) via a series of total internal reflections. The optical surface (104) may comprise at least on optical cavity pattern (101). The element (100) is configured to receive light onto said at least one three-dimensionally formed optical surface (104) from a direction essentially parallel to a longitudinal plane of the planar lightguide (20). A method for manufacturing the (Continued)

optical incoupling element (100), related arrangement, optical unit (250) and uses are further provided.

36 Claims, 22 Drawing Sheets

(56) References Cited

U.S. PATENT DOCUMENTS

| | | | | |
|---|---|---|---|---|
| 10,030,846 | B2* | 7/2018 | Vasylyev | G02B 6/0031 |
| 10,598,938 | B1 | 3/2020 | Huang et al. | |
| 11,035,993 | B2* | 6/2021 | Vasylyev | G02B 6/0068 |
| 2003/0142507 | A1* | 7/2003 | Sugiyama | G02B 6/0028 |
| | | | | 362/551 |
| 2003/0210537 | A1* | 11/2003 | Engelmann | H03K 17/96 |
| | | | | 362/276 |
| 2006/0087840 | A1* | 4/2006 | Franklin | F21S 11/00 |
| | | | | 362/228 |
| 2006/0215387 | A1* | 9/2006 | Wang | G02B 6/0083 |
| | | | | 362/23.18 |
| 2006/0221638 | A1* | 10/2006 | Chew | F21V 29/745 |
| | | | | 362/616 |
| 2007/0183040 | A1* | 8/2007 | Sinyugin | G02B 6/0041 |
| | | | | 359/515 |
| 2010/0061101 | A1 | 3/2010 | Van Pieterson et al. | |
| 2010/0085750 | A1* | 4/2010 | Van Ostrand | G02B 6/0028 |
| | | | | 385/27 |
| 2010/0111515 | A1* | 5/2010 | Saitoh | G02B 6/0018 |
| | | | | 362/558 |
| 2010/0214281 | A1* | 8/2010 | Ueno | G02B 6/008 |
| | | | | 362/97.1 |
| 2014/0226361 | A1 | 8/2014 | Vasylyev | |
| 2015/0009687 | A1 | 1/2015 | Lin | |
| 2015/0192742 | A1 | 7/2015 | Tarsa et al. | |
| 2017/0045666 | A1* | 2/2017 | Vasylyev | G02B 6/0068 |
| 2018/0031840 | A1 | 2/2018 | Hofmann et al. | |
| 2020/0224853 | A1 | 7/2020 | Vasylyev | |
| 2020/0257044 | A1 | 8/2020 | Rinko | |
| 2021/0003766 | A1 | 1/2021 | Rinko | |
| 2021/0011211 | A1 | 1/2021 | Rinko | |

FOREIGN PATENT DOCUMENTS

| | | |
|---|---|---|
| CN | 111886441 | 11/2020 |
| JP | 10-111511 | 4/1998 |
| JP | 2000-249837 | 9/2000 |
| JP | 4000704 | 8/2007 |
| JP | 2017-107174 | 6/2017 |
| WO | 2019069909 | 4/2019 |
| WO | 2019/182098 | 9/2019 |

OTHER PUBLICATIONS

Bernard C. Kress, "Optical waveguide combiners for AR headsets: features and limitations", Digital Optical Technologies 2019, Jul. 16, 2019, pp. 110620J.

Moon et al., "Microstructured void gratings for outcoupling deep-trap guided modes", Opt. Express 26, 2018, pp. A450-A461.

International Search Report issued in International Patent Application No. PCT/JP2021/028955, dated Oct. 12, 2021.

Written Opinion issued in International Patent Application No. PCT/JP2021/028955, dated Oct. 12, 2021.

Taiwanese Office Action and Search Report issued in TW Application No. 110129133, dated Dec. 13, 2024, with an English translation thereof.

Extended European Search Report issued in EP Application No. 21853839.5, dated Jul. 10, 2024.

Chinese Office Action and Search Report received in CN Application No. 202180056625.8, dated May 14, 2025, and English translations thereof.

* cited by examiner

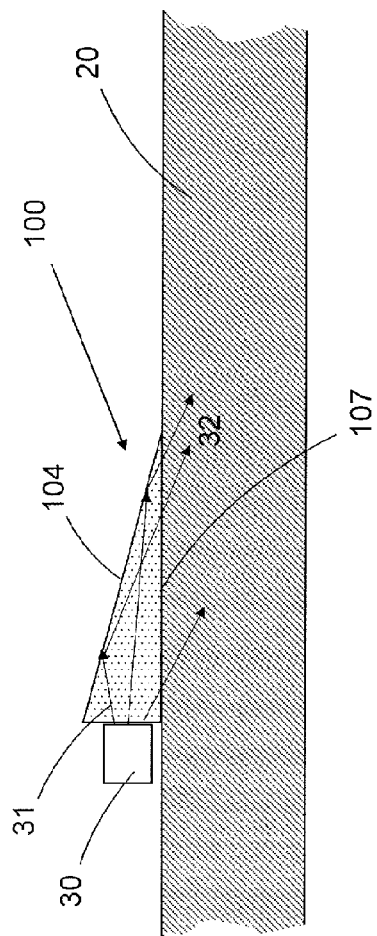
[Fig. 1A]

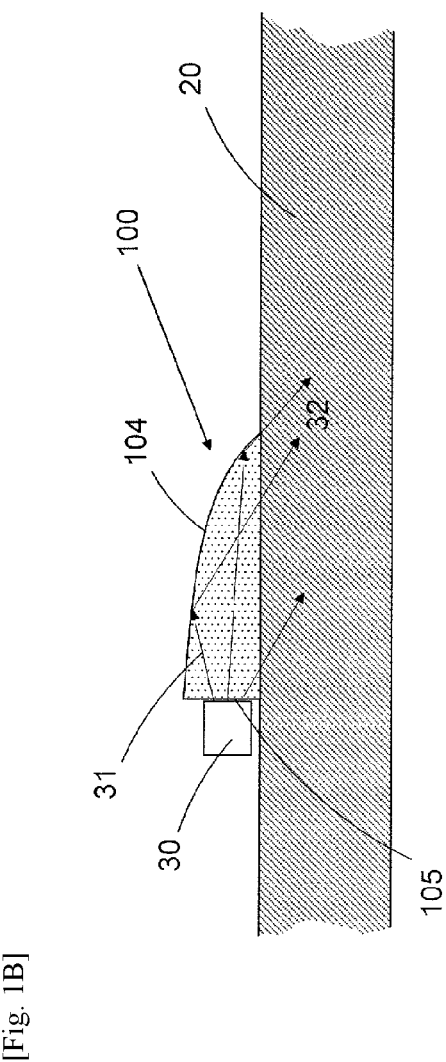
[Fig. 1B]

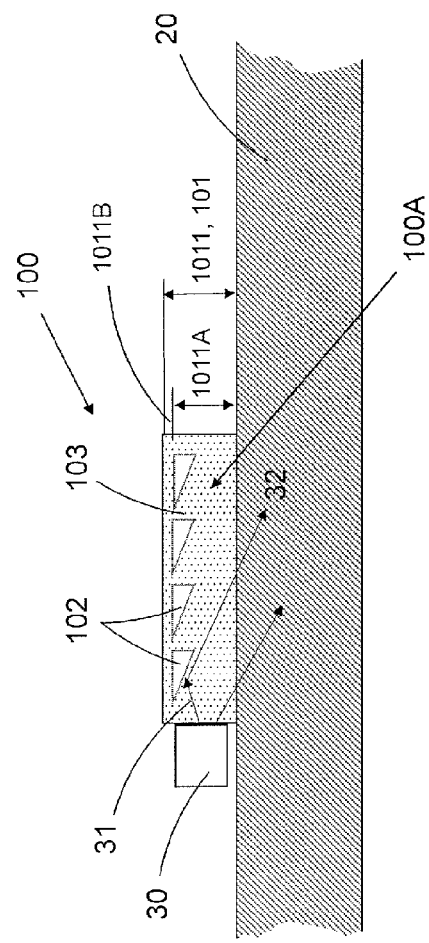
[Fig. 1C]

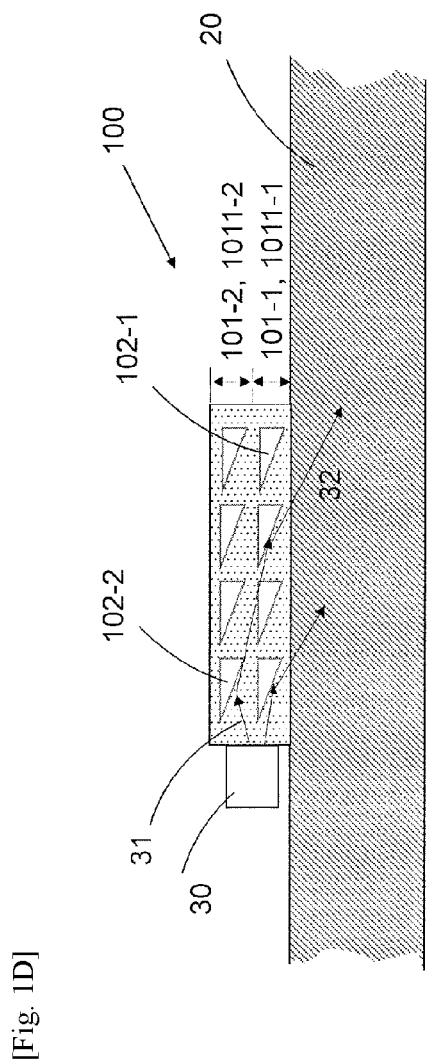
[Fig. 1D]

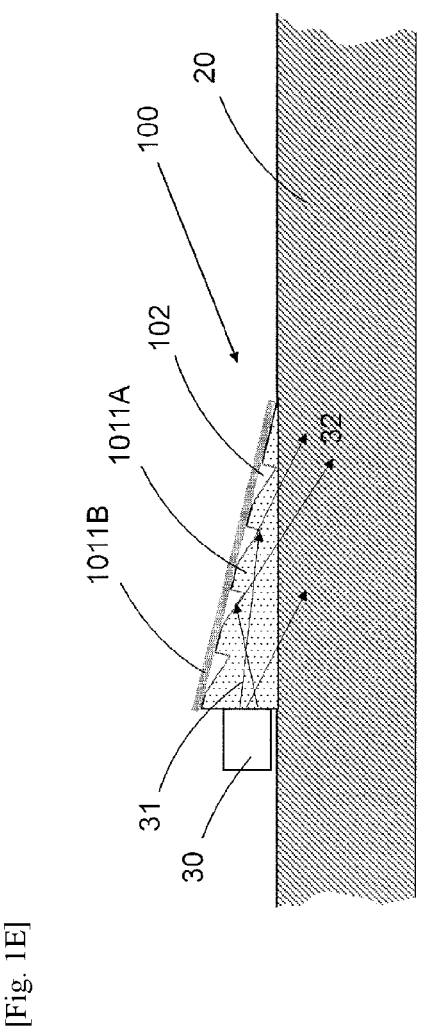
[Fig. 1E]

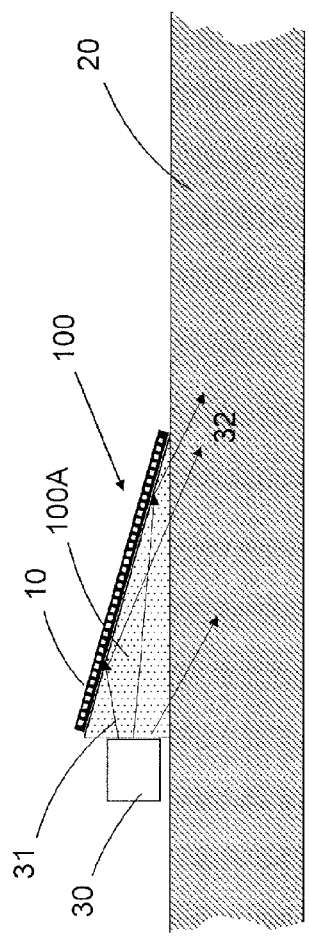
[Fig. 1F]

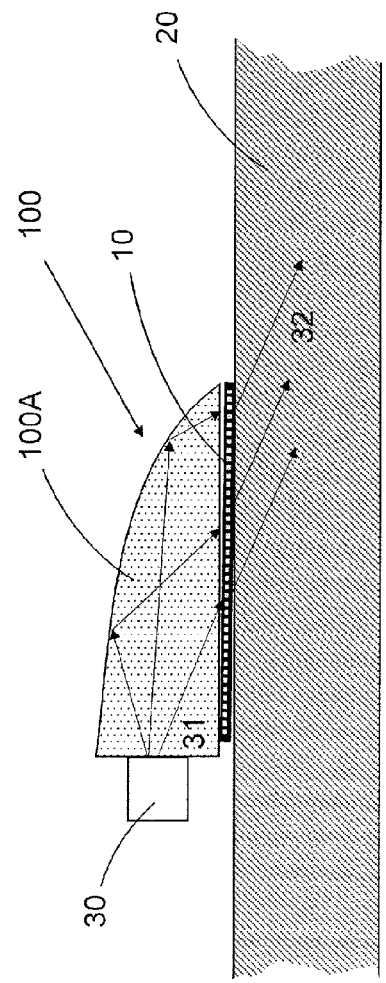
[Fig. 1G]

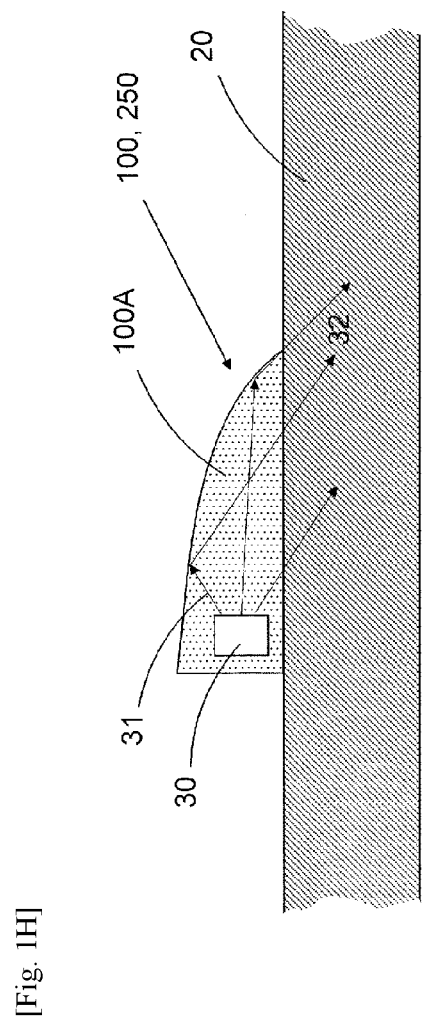
[Fig. 1H]

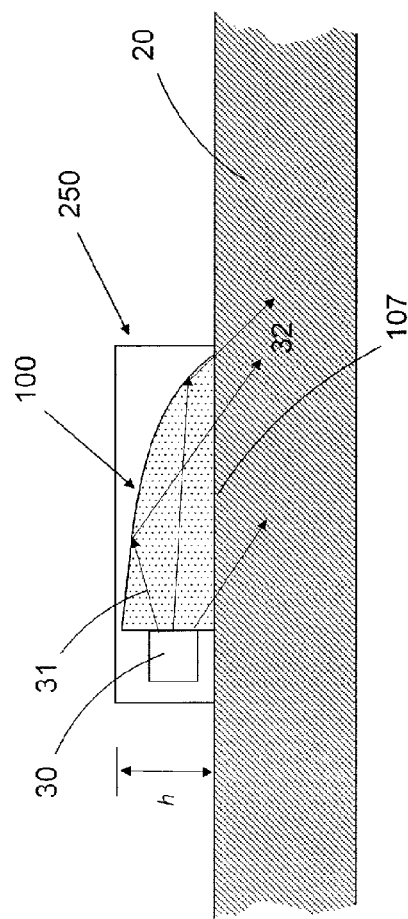
[Fig. 1I]

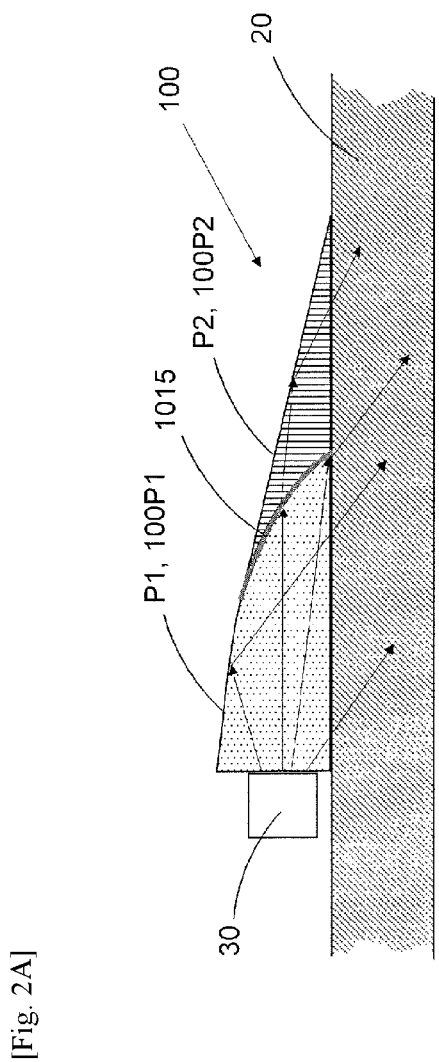
[Fig. 2A]

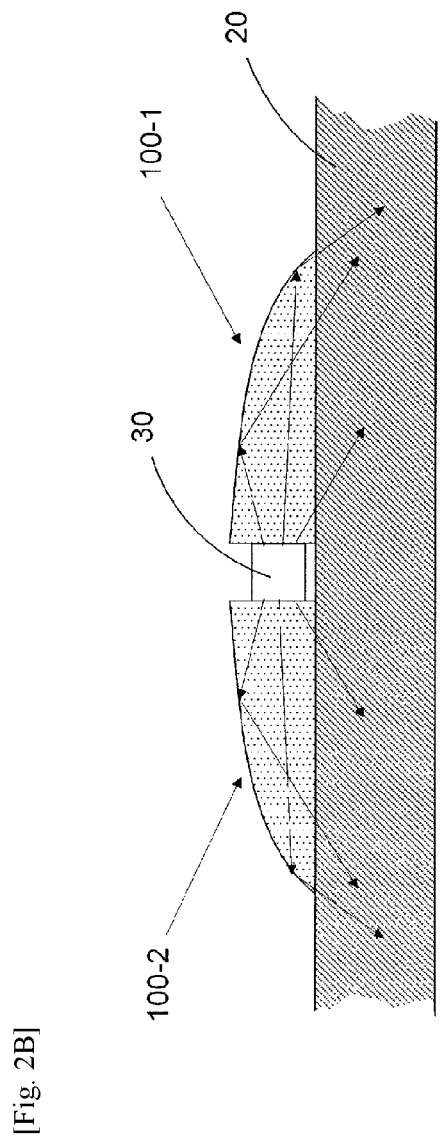
[Fig. 2B]

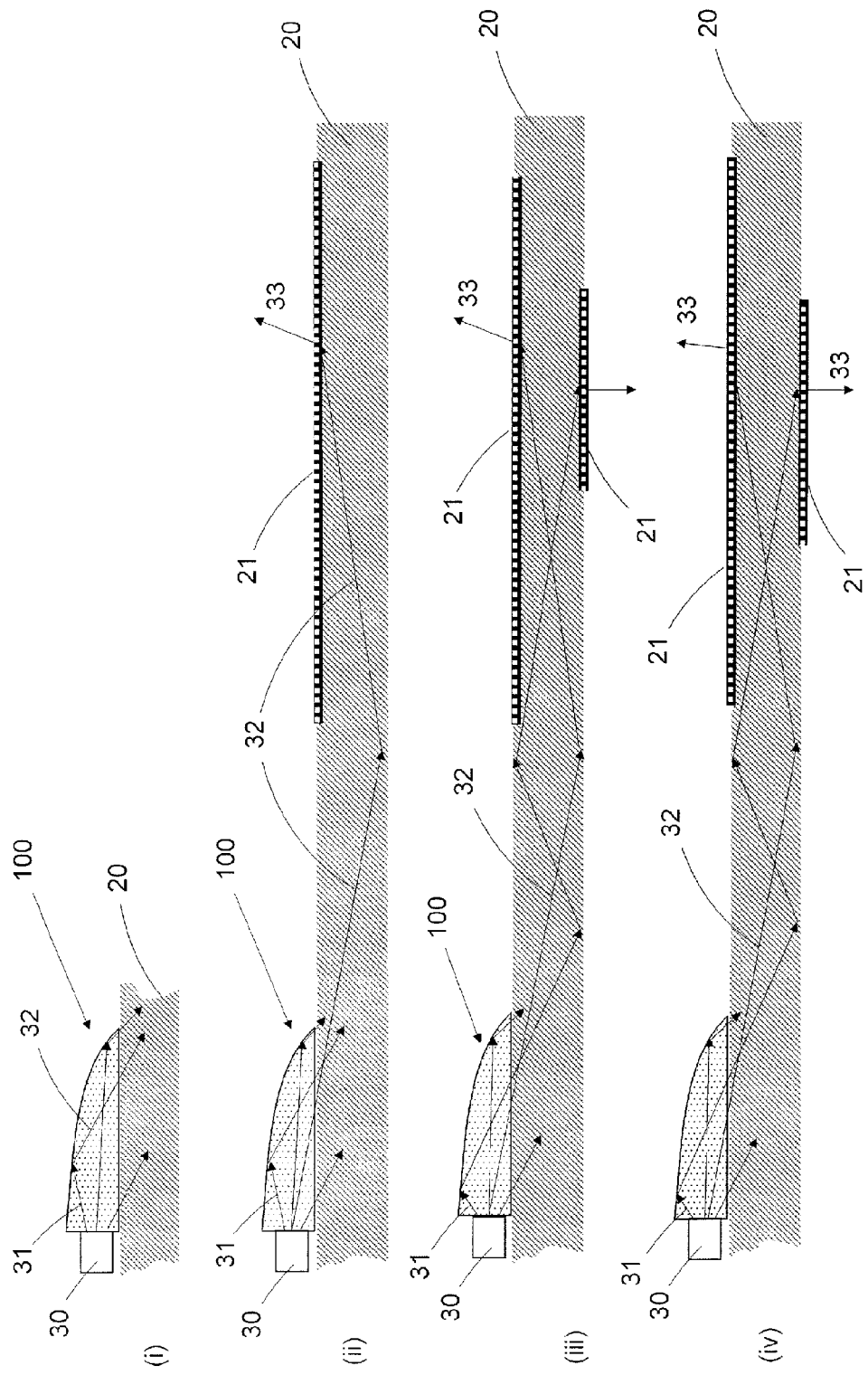

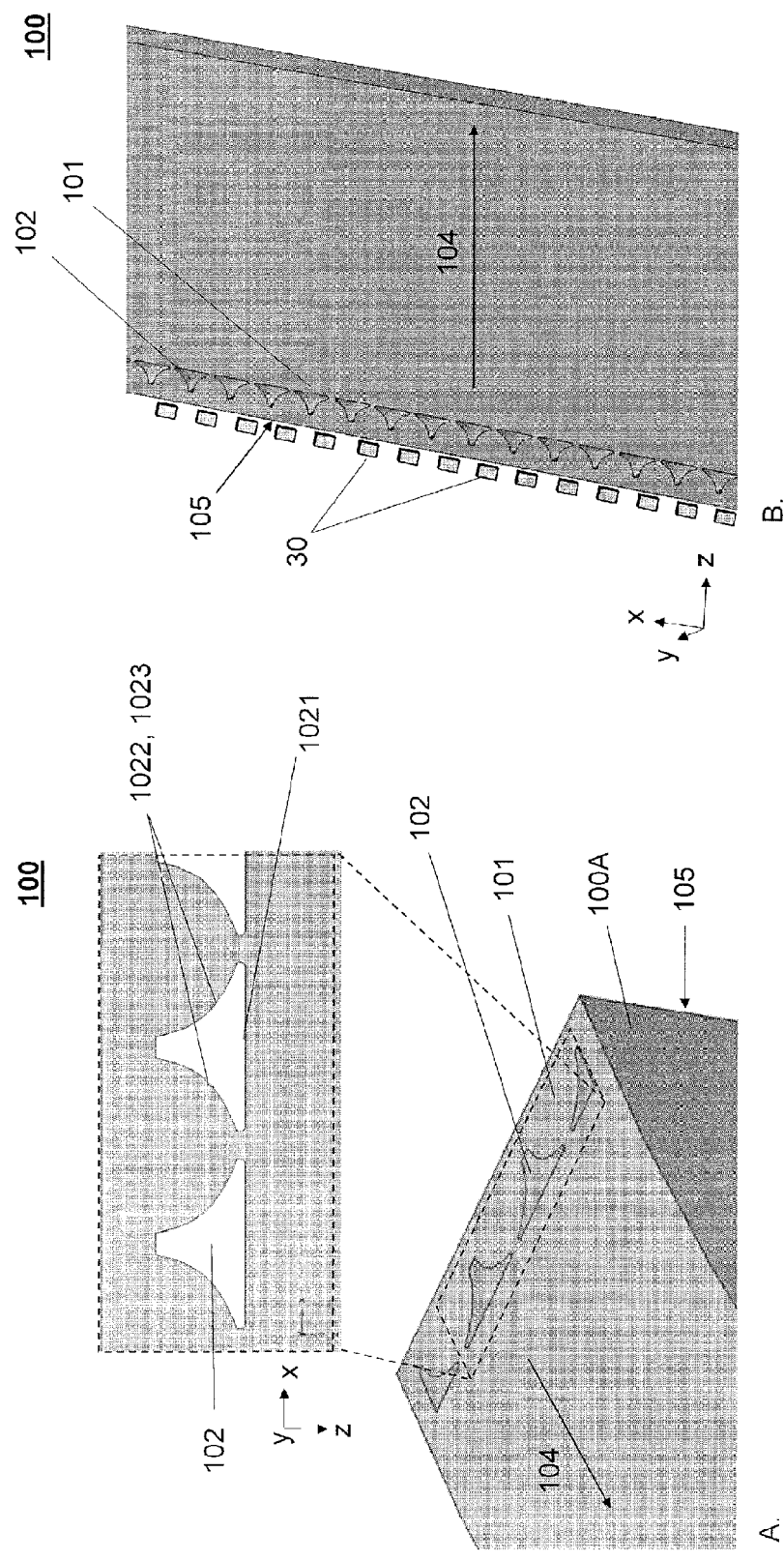
[Fig. 4]

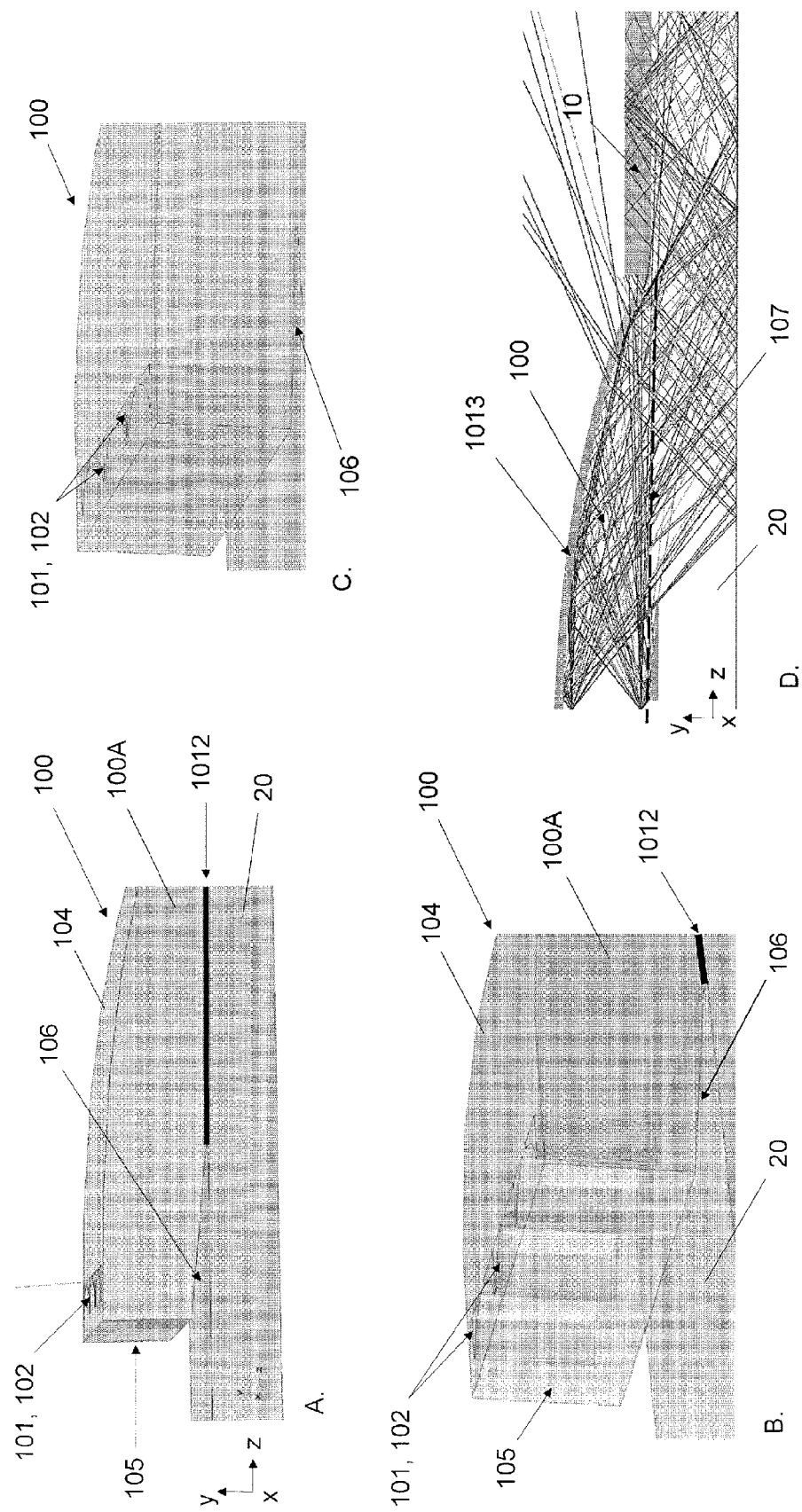
[Fig. 5]

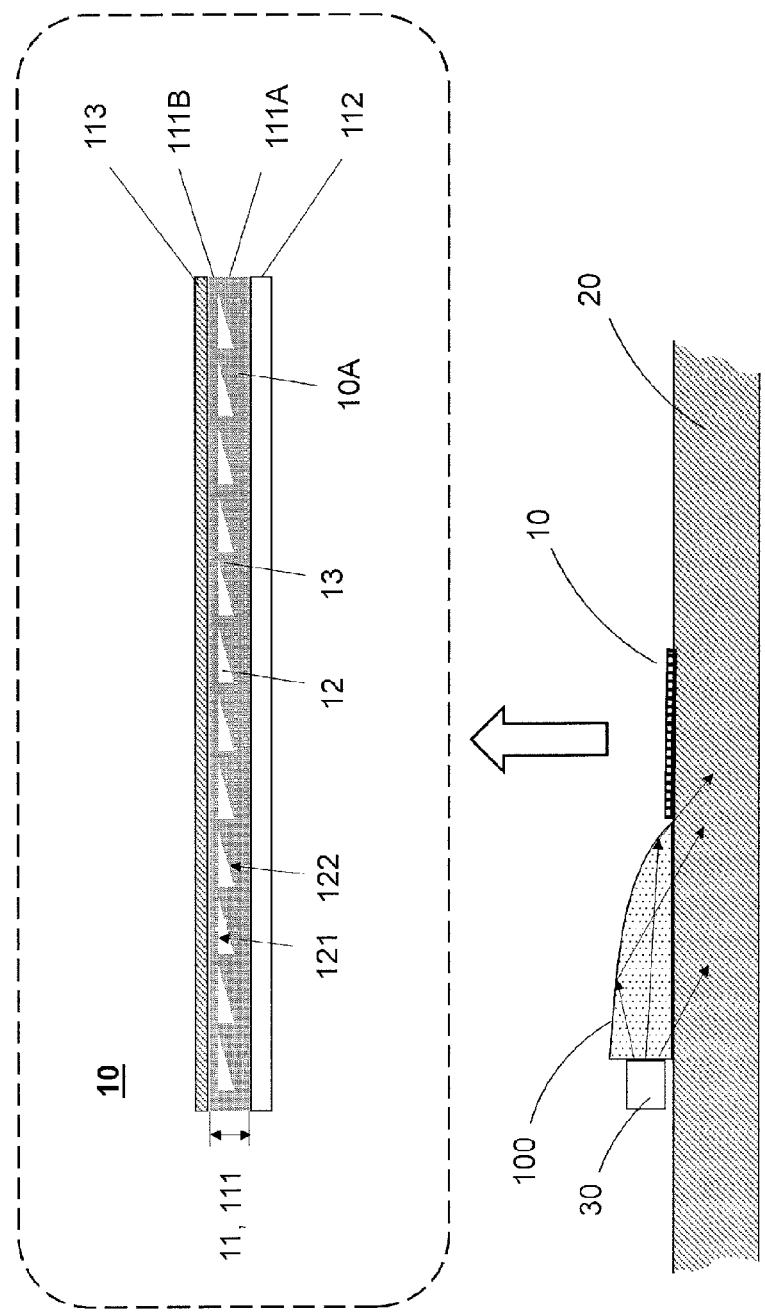

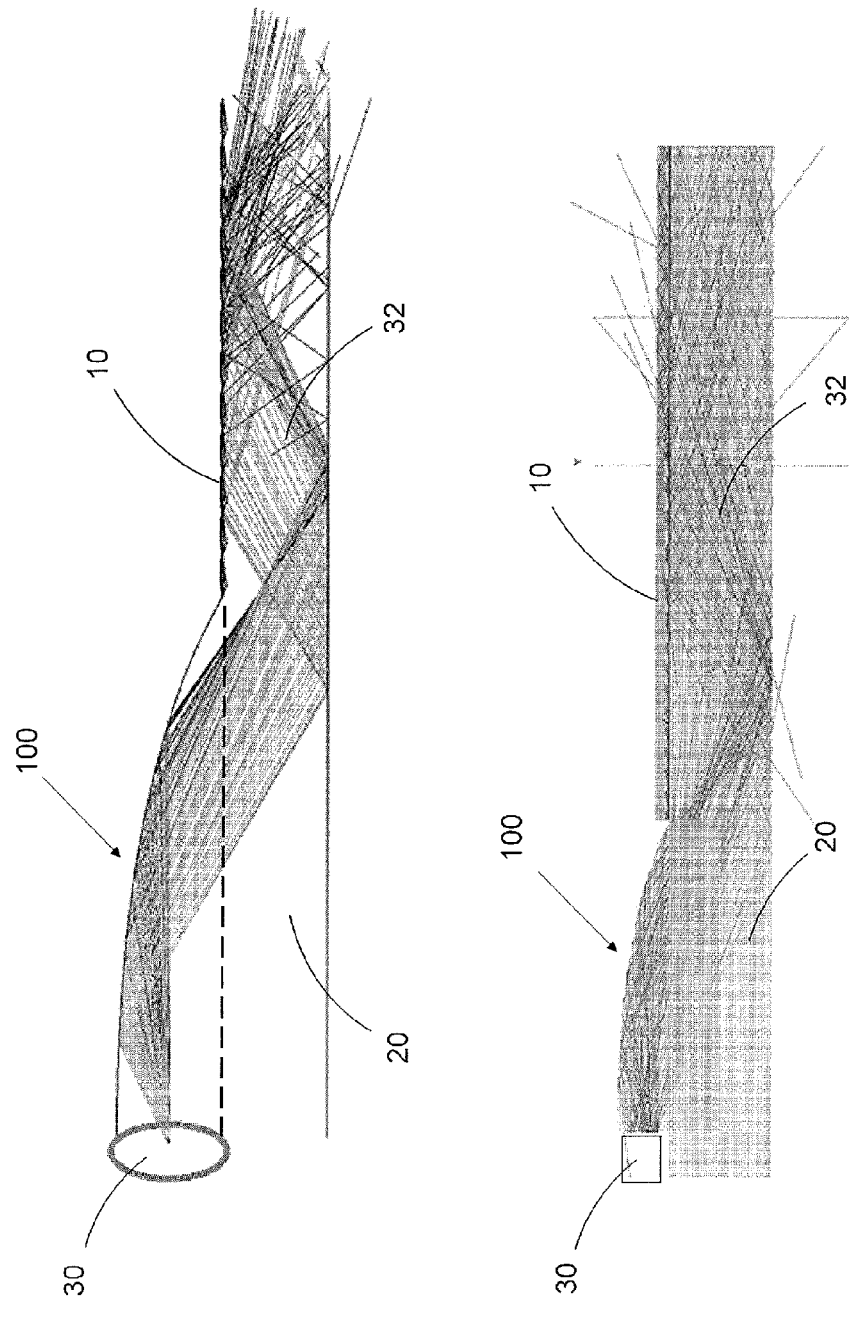
[Fig. 7]

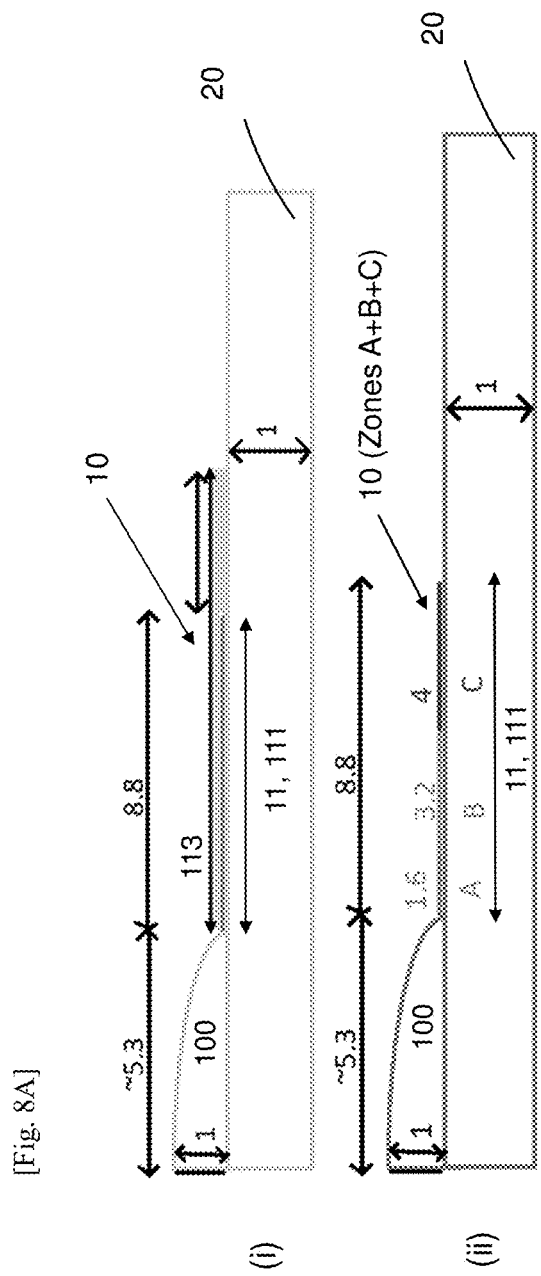
[Fig. 8A]

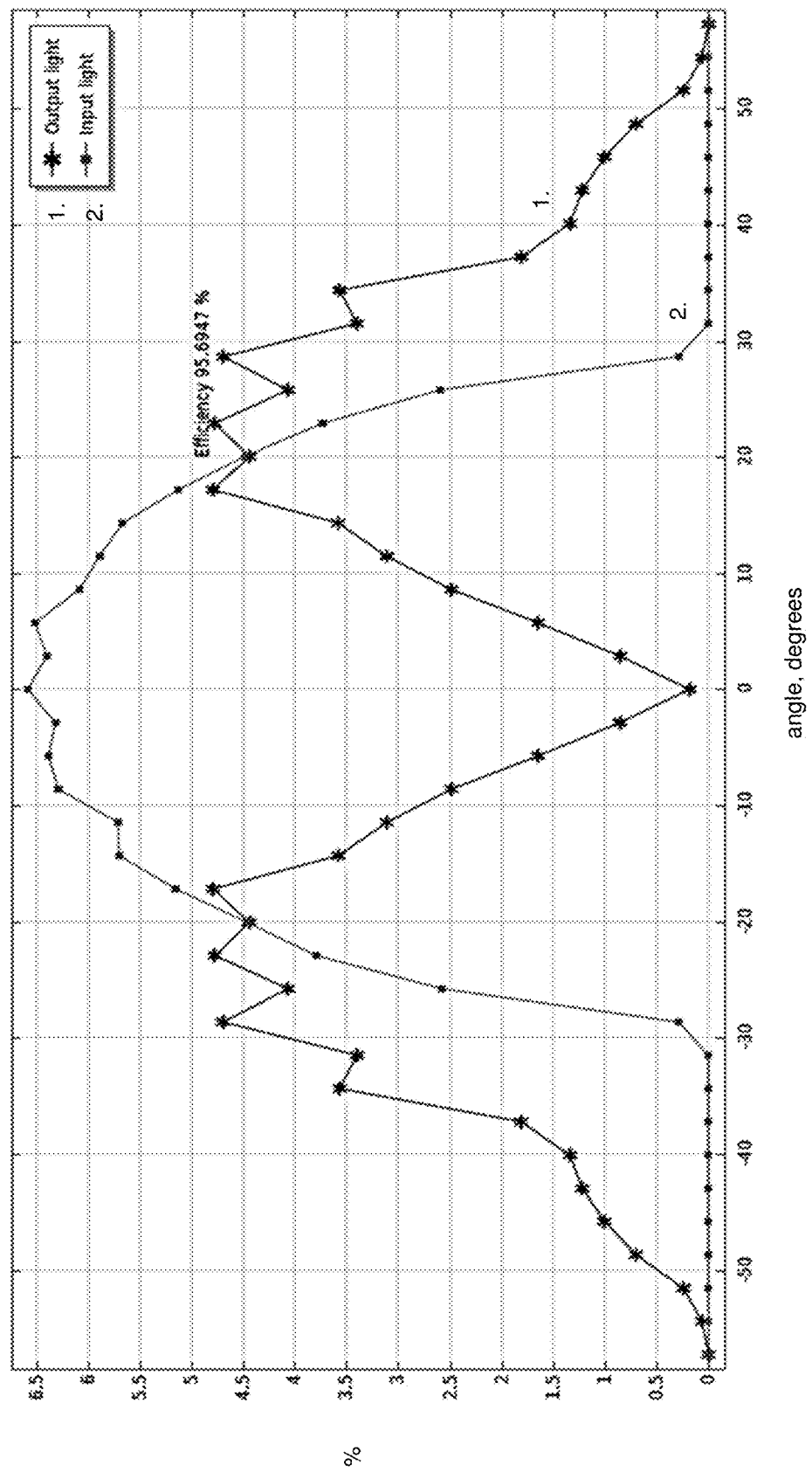
[Fig. 8B]

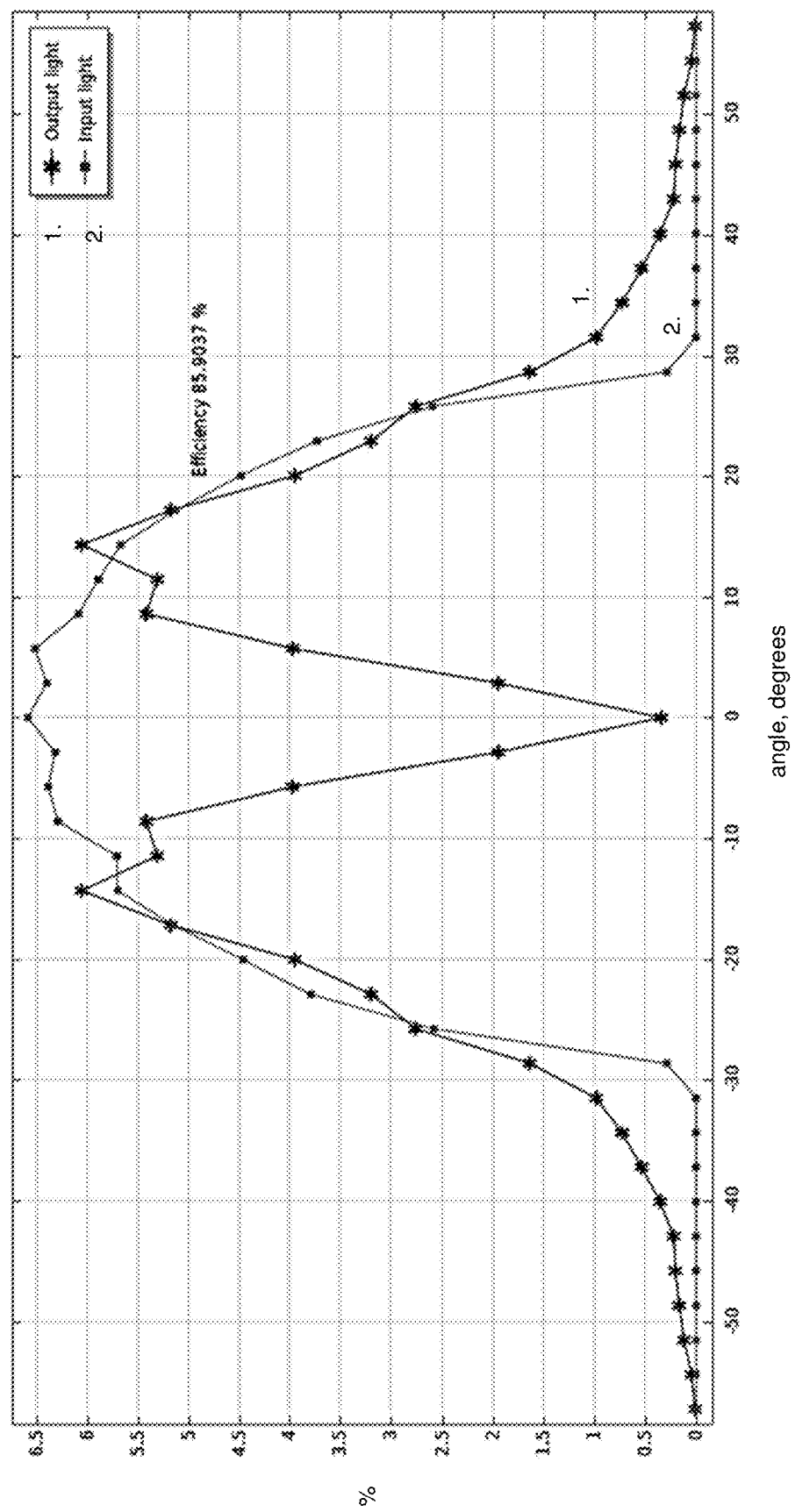
[Fig. 8C]

[Fig. 9]
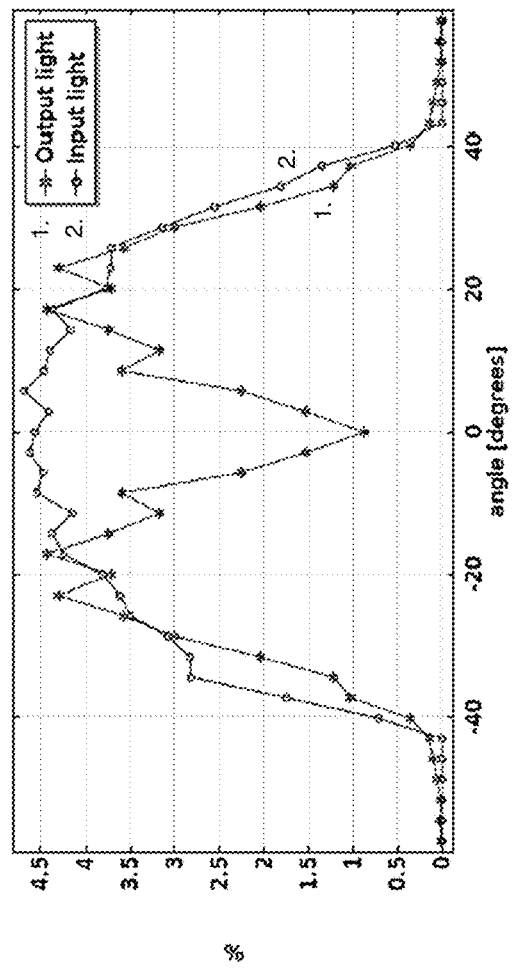
A. Vertical distribution
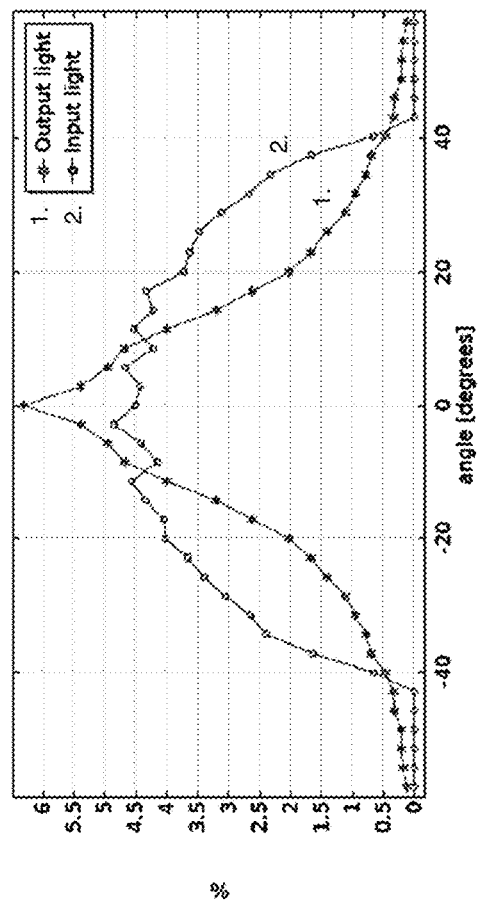
B. Horizontal distribution
[Fig. 10A]
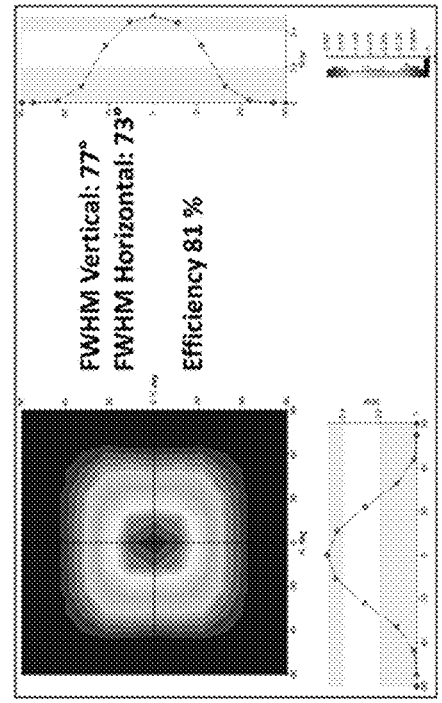
FWHM Vertical: 77°
FWHM Horizontal: 73°
Efficiency 81%
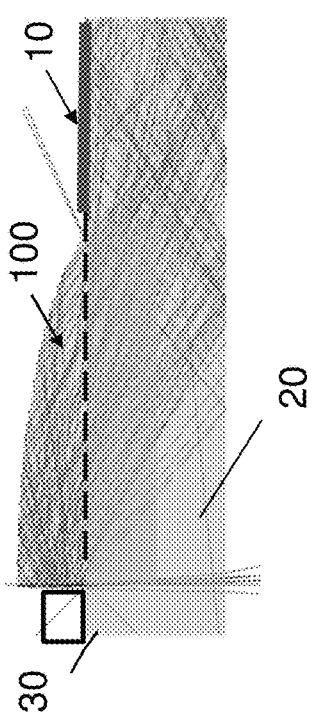

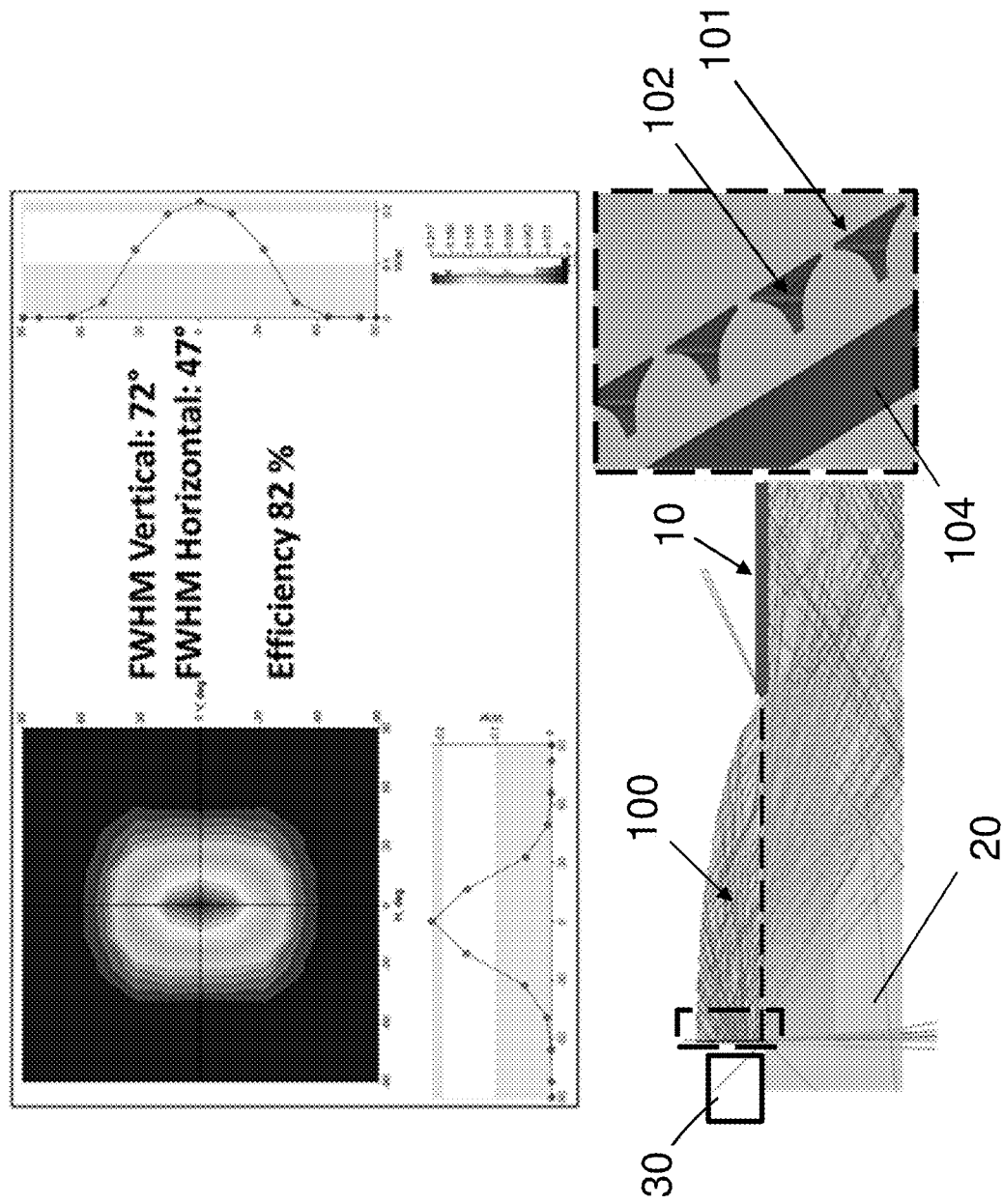

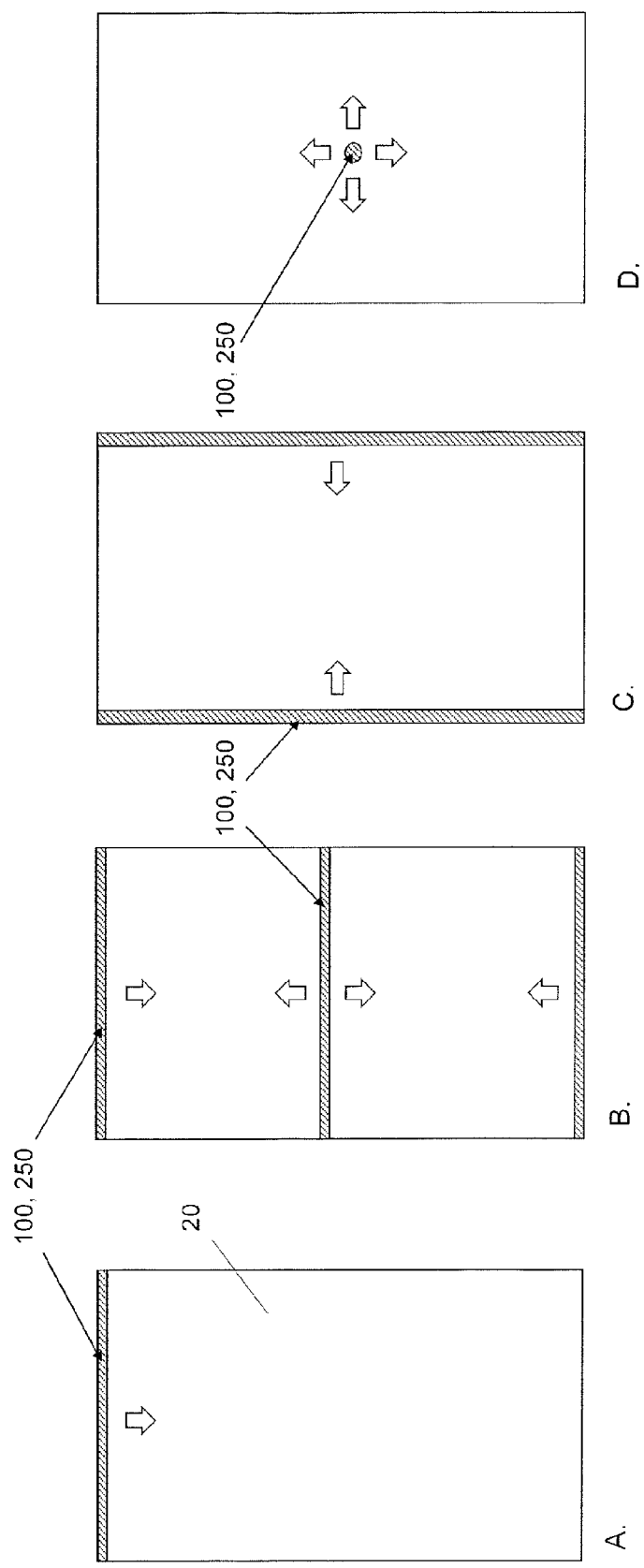

LIGHT INCOUPLING ELEMENT, RELATED METHOD AND USES

TECHNICAL FIELD

Generally the present invention pertains to provision of optical structures for waveguides and methods for producing the same. In particular, the invention concerns an element solution having a predetermined shape and based on integrated cavity-optics adapted to incouple emitted light into an optical waveguide and to control light propagation through said waveguide, related methods and uses.

BACKGROUND ART

Optical waveguide or lightguide technology has been widely used in a variety of state-of-the-art applications. Proper selection of a light distribution system often predetermines illumination performance of the optical waveguide in lighting- and display applications. A typical lightguide (LG) system contains components for edge incoupling light ray emitted by one or more emitter, components for light distribution through the lightguide element and component(s) or area(s) for light extraction (outcoupling). The incoupling structures receive light and adjust its direction to guide light rays into the light distribution area. Advanced lightguides include optical patterns that control light edge incoupling efficiency upon entering the lightguide.

In order to control angular distribution of emitted light and to achieve a desired optical performance, conventional lightguide solutions designed for illumination applications still utilize a number of separate optical films, such as brightness enhancement films (BEFs), for example. Known lightguide solutions implemented without BEFs typically employ microlens- and V-groove shaped optical patterns. By using such solutions, it is impossible to achieved fully controlled light distribution in a desired manner. Light incoupling is typically performed at the edge of the lightguide without any advance optic solution. In some special cases, such augmented and virtual reality headsets, planar surface incoupling is utilized based on surface relief gratings, for example, which are included in the lightguide element.

US 2018/031840 A1 (Hofmann et al) discloses an optical element with an embedded optical grating to extract light from a lightguide. Surface of the grating is coated with an optically effective layer by using known methods, such as chemical vapour deposition (CVD) or physical vapour deposition (PVD). Moreover, the recesses present in the grating are filled up with an optical cement or optical adhesive material.

U.S. Pat. No. 10,598,938 B1 (Huang & Lee) discloses an angular selective slanted grating coupler for controlling angles at which the light is coupled out from the lightguide or coupled in the lightguide. Selectivity can be achieved by modulating refractive index between gratings or modulating a duty cycle of the gratings in different regions.

Kress [1] discloses in- and outcouplers for optical waveguides, said couplers comprising different types of gratings configured for a transmissive function and/or a reflective function. The couplers can sandwiched/buried in a lightguide or provided as surface relief solutions.

Moon et al [2] discloses an outcoupler using microstructured hollow (air) cavity gratings to improve light extraction in LED devices. Hollow cavities are fabricated in semiconductor materials with typical methods. Apart from LEDs, other applications (e.g. in lightguides) of the outcoupler solution are not provided.

Angulo Barrios and Canalejas-Tejero [3] disclose a light coupling solution in a flexible Scotch tape waveguide attainable via an integrated metal diffraction grating. Incoupling and outcoupling gratings are embedded inside two layers of the Scotch tape; whereby the Scotch tape is rendered with an optical waveguide functionality. The grating is implemented as a metal (Al) nanohole array (NHA) grating.

US 2015/192742 A1 (Tarsa & Durkee) discloses a light extraction film laminated on the surface of a lightguide. Light extraction function is based on Total Internal Reflection (TIR). The extraction film forms air pockets between the film and the lightguide, upon being secured, by lamination, for example, to the lightguide.

Designing and optimizing lightguide-based illumination-related solutions is confronted with a number of challenges associated with non-uniform light distribution inside the lightguide, insufficient coupling, light trapping and/or extraction efficiency. The above described solutions are also limited in a sense of being incapable of providing integrated air-cavity optics-based solutions with satisfactory versatility and adaptability for a variety of target applications, such as large-sized window illumination with planar surface light incoupling.

In this regard, an update in the field of optical structures for non-fiber lightguides aiming at enhancing luminance uniformity and improving optical efficiency of said lightguides, is still desired, in view of addressing challenges associated with manufacturing and assembling of presently existing solutions.

SUMMARY OF INVENTION

An objective of the present invention is to at least alleviate each of the problems arising from the limitations and disadvantages of the related art. The objective is achieved by various embodiments of an optical incoupling element, according what is defined in the independent claim 1.

In embodiment, an optical incoupling element for a lightguide is provided in the form of a discrete, optically functional item that comprises a substrate and at least one three-dimensionally formed optical surface, wherein said at least one three-dimensionally formed optical surface is configured to incouple all light incident thereto and to adjust direction of the incoupled light transmitted through an optical contact surface established at an interface between the element substrate and a lightguide medium such, that the incoupled light acquires a propagation path through a lightguide medium via a series of total internal reflections. The element is configured to receive light onto said at least one three-dimensionally formed optical surface from a direction essentially parallel to a longitudinal plane of the planar lightguide, whereupon essentially all light emitted by an emitter device enters into the optical incoupling element and essentially all light received by the incoupling element is incoupled into the lightguide. The element is further configured attachable onto at least one planar surface of the lightguide.

In an embodiment, the optical incoupling element is configured such that light emitted from the emitter device enters to the optical incoupling element and does not enter to an edge of the lightguide. Hence, all light received into the incoupling element is incoupled into the lightguide from the planar surface thereof.

In embodiment, the incoupling element is configured such, that the incoupled light is redirected at an interface between the three-dimensionally formed optical surface and the ambient and/or at the interface between the element substrate and the lightguide medium to acquire the propagation path through the lightguide medium, whereupon an angle of incidence at an interface between the lightguide medium and the ambient is/are larger than or equal to a critical angle of total internal reflection.

In embodiment, the incoupling element comprises at least one optical pattern established with a number of periodic pattern features formed in the element substrate and configured as optically functional cavities.

In embodiment, the incoupling element comprises at least one optical pattern formed with optically functional cavities fully embedded in the element substrate and filled with a material having a refractive index different from the refractive index of the material of the substrate surrounding the cavity.

In embodiment, said at least one optical pattern is configured to incouple light incident thereto and to redirect incoupled light at an interface between each said cavity and the material of the substrate surrounding the cavity such, that the incoupled light acquires a propagation path through the lightguide medium, whereupon an angle of incidence at an interface between the lightguide medium and the ambient, and, optionally, an angle of incidence at the interface between each cavity and the material of the substrate surrounding the cavity is/are larger than or equal to a critical angle of total internal reflection.

In embodiment, in said incoupling element, the at least one three-dimensionally formed optical surface and optionally the at least one cavity pattern is/are configured to perform an optical function related to incoupling- and adjusting direction of light received thereto, wherein said optical function is selected from a group consisting of: a reflection function, an absorption function, a transmittal function, a collimation function, a refraction function, a diffraction function, a polarization function, and any combination thereof.

In embodiment, in said incoupling element, each individual cavity in the pattern has a number of optically functional surfaces. In embodiments, the optically functional surface or surfaces is/are established by any surface or surfaces formed at the interface between each cavity and the material of the substrate surrounding the cavity.

In embodiments, in said incoupling element, the three-dimensionally formed optical surface and/or the optically functional surface or surfaces formed in the cavity pattern comprise any one of a low refractive index reflector, a polarizer, a diffuser, an absorber, or any combination thereof.

In embodiments, in said incoupling element, the cavity pattern or patterns is/are configured to perform at least one optical function by virtue of adjusting a number of parameters related to a cavity- or a group of cavities in the pattern, wherein the number of parameters comprises an individual parameter or any combination of parameters selected from the group consisting of: dimensions, shape, cross-sectional profile, orientation, periodicity, and fill factor.

In different embodiments, in said incoupling element, the cavities are configured and arranged in the cavity pattern such, as to form a substantially variable periodic pattern or to form a substantially constant periodic pattern.

In embodiment, in the cavity pattern the cavities are established with discrete or at least partly continuous pattern features.

In embodiment, the cavities are established with two-dimensional- or three-dimensional pattern features having cross-sectional profiles selected from the group consisting of: linear, rectangular, triangular, blazed, slanted, trapezoid, curved, wave-shaped and sinusoidal profiles.

In embodiment, the optical incoupling element comprises at least two substrate components, optionally layers, wherein at least one cavity pattern is formed in an essentially flat, planar surface of any one of said substrate components, whereby a substrate component with a patterned surface is established and brought against an entirely flat, planar surface of one another substrate component such, that at least one embedded cavity pattern with embedded cavities alternating with flat junction areas is formed at an interface between the patterned substrate surface- and the entirely flat, planar surface of said substrate components.

In said incoupling element, the element substrate or at least the substrate component with a patterned surface can be made of substantially optically transparent material. In said incoupling element, the substrate component with the entirely flat, planar substrate surface can be further made of any one of: an optically transparent material, a coloured material, a reflector material, and a combination thereof.

In embodiment, the embedded cavities are filled with a gaseous material, such as air.

In embodiment, the incoupling element comprises a number of embedded cavity patterns arranged in a stacked configuration.

In embodiment, the incoupling element comprises a lightguide attachment surface, wherein said lightguide attachment surface is an adhesion layer.

In embodiment, the incoupling element is configured such that at least a portion of its external surface laid essentially opposite to the lightguide attachment surface is tapered relative to the longitudinal plane of the planar lightguide.

In embodiment, in said incoupling element, the three-dimensionally formed optical surface optionally comprising at least one embedded pattern is arranged on a plane defined by a surface of said element laid essentially opposite to the lightguide attachment surface.

In embodiment, in said incoupling element, the three-dimensionally formed optical surface optionally comprising at least one embedded pattern is arranged on a plane defined by a surface of said element essentially perpendicular relative to the longitudinal plane of the planar lightguide and facing an emitter device.

In embodiment, the incoupling element comprises at least two adjacent functional zones independently configured to perform the optical function related to incoupling light incident thereto and adjusting direction of the incoupled light such, that the incoupled light is (re)directed into the lightguide medium.

In embodiment, said at least two adjacent functional zones are formed by separate element modules interconnected by means of an interfacial layer, optionally, an adhesive.

In embodiment, the incoupling element is provided in the form of an elongated strip.

In another aspect, an arrangement is provided comprising at least two incoupling elements arranged on the lightguide, in accordance to what is defined in the independent claim 29. In said arrangement, each said element is the optical incoupling element, according the previous aspect.

In another aspect, a method for manufacturing an optical incoupling element in the form of a discrete, optically functional item is provided, in accordance to what is defined in the independent claim 30.

In embodiment, said method comprises:
  manufacturing a master tool for the pattern by a fabrication method selected from any one of: lithographic, three-dimensional printing, micro-machining, laser engraving, or any combination thereof;
  transferring the pattern onto the element substrate to generate the optical surface with a predetermined optical function, wherein said at least one pattern is configured to incouple light incident thereto and to adjust direction of the incoupled light transmitted through an optical contact surface established at an interface between the element substrate and a lightguide medium such, that the incoupled light acquires a propagation path through a lightguide medium via a series of total internal reflections, and wherein the element is configured to receive light onto said at least one pattern from a direction essentially parallel to a longitudinal plane of the planar lightguide.

In embodiment, the method comprises applying an additional substrate layer onto a patterned element surface by a lamination method selected from any one of: a roll-to-roll lamination, a roll-to-sheet lamination or a sheet-to-sheet lamination, to generate an embedded cavity pattern or patterns.

In embodiment, the method further comprises replication of a fabricated pattern, wherein pattern replication method is selected from any one of imprinting, extrusion replication or three-dimensional printing.

In another aspect, a lightguide is provided, in accordance to what is defined in the independent claim 33. Said lightguide comprises an optically transparent medium configured to establish a path for light propagation through the lightguide and at least one optical incoupling element according to some previous aspect, optionally provided as a part of an arrangement according to some other previous aspect, said element or elements being attachable onto at least one planar surface of said lightguide.

In embodiment, the lightguide comprises the optical incoupling element or elements attached to the lightguide surface by adhesion.

In another aspect, use of a lightguide according to some previous aspect is provided in illumination and/or indication, in accordance to what is defined in the independent claim 35.

In still further aspect, an optical unit is provided, in accordance to what is defined in the independent claim 36. Said optical unit comprises an optical incoupling element, according to some previous aspect, with an adhesion layer for a lightguide attachment and at least one emitter device.

In embodiment, the optical unit is at least partly integrated inside the substrate material forming the optical incoupling element.

In embodiment, the at least one emitter device is selected from a group consisting of: a Light Emitting Diode (LED), an Organic Light Emitting Diode (OLED), a laser diode, a LED bar, an OLED strip, a microchip LED strip, and a cold cathode tube.

In embodiment, the optical unit comprises at least one light emitter device configured for emitting monochromic light, and the optical incoupling element that comprises the wavelength conversion layer.

The utility of the present invention arises from a variety of reasons depending on each particular embodiment thereof. At first, the invention pertains to a novel optical incoupling structure configured to incouple photons of optical radiation (light) emitted by at least one light source and to adjust direction on incoupled light rays to mediate light propagation through the lightguide medium. The incoupling element according to the present invention is advantageously designed for a planar, non-fiber lightguide.

One of the primary benefits offered by the optical incoupling element according to the present invention is incoupling of light into planar lightguide surface(s). Hence, the element enables incoupling of light rays arriving onto the planar lightguide surface from any direction, and efficient capturing of the light rays inside said planar lightguide. At the same time, the incoupling element adjusts direction of incoupled light such, that light rays stay inside the lightguide (light leakage is prevented). In particular, the element disclosed hereby enables incoupling of light into large-sized (planar) windowpanes; the latter being impossible with presently known solutions based on incoupling from the edge of the window.

Known incoupling solutions are typically fixed, solid structures provided inside the lightguide that prevents them from being efficiently used in preinstalled window surfaces, for example, for the above mentioned reasons. In terms of manufacturing, such fixed incoupling structures are not suitable for high-volume production, such as by etching on a window glass installed in the building, for example. Additionally, mentioned fixed solutions do not allow for combining different optical functionalities in the same incoupling structure.

The incoupling element presented hereby provides additional flexibility with regard to positioning of a light source. Light emitter can be integrated inside element or installed adjacent to- or on the element. Alternatively, the emitter can be placed at a distance from the element to avoid subjecting the element and lightguide to heat energy (e.g. in case of a laser light source).

The incoupling element can be assembled on top- and/or bottom surfaces of a planar lightguide by an optically clear adhesive, for example, to form a sealed optical contact. The incoupling element controls incoupling of emitted light and its further propagation inside the optical medium (viz., the lightguide medium). The incident light incoupled on the element pattern(s) is caused to deviate from the original propagation path by a certain angle by means of (air)-cavity optics embedded inside of the incoupling element. Totally integrated and embedded cavity optics is based on two- or three-dimensional pattern matrix, which may comprise a single-profile or multiple profiles, and by virtue of profile configuration, to attain a desired light management.

One of the primary optical functions of the incoupling element according to the present disclosure is incoupling- and adjusting direction of light incident at optical patterns at an angle of incidence larger than or equal to a critical angle of total internal reflection. This feature is achievable by providing the incoupling element with a variety of embedded features designed to perform a predetermined optical function or functions, such as a reflective function, a refractive function, a deflective function, a diffractive function, a diffusive function and any combination thereof. These and other optical functions, such as light transmission, absorption, polarization, etc., are achieved by virtue of carefully selecting materials for the element substrate components and/or layers, pattern profiles and filling materials, filling factor, surface coatings, adhesive materials, and the like.

One of the key features of the incoupling element is light source integration thereto, which enables assembling and utilization of the incoupling element in more simple and reliable manner, meaning provision of a so called "all-inone" solution, viz. a one-part element with an option of direct bonding, by adhesion, for example, on a planar lightguide surface.

The incoupling element can adopt a variety of configurations. In some instances, the incoupling element is formed with a discrete three-dimensional optical part of a predetermined shape attachable on a planar waveguide surface. The element can be provided as an elongated band or a strip or as an essentially circular, dot-like component. Moreover, the incoupling element may utilize light source emitting in single- or dual directions or in a plurality of directions (360° light emission and propagation).

The incoupling element is extremely easy to install and it provides flexibility for removal, changing and installing again to wherever desired. The optical structure(s) in the element is/are protected from external conditions and thus reliable. Improved incoupling efficiency and enhanced light distribution control also improve the characteristics of outcoupled light.

Optical incoupling element, according to the present disclosure, is easy and reliable to utilize because of its embedded cavity optics, which, due to its internal nature, cannot be destroyed or defected by normal handling procedures, including assembling, cleaning, etc. In a ready-to-use state the element does not have any surface relief patterns formed on its surfaces. In certain configurations, the element comprises a light source totally integrated inside the substrate material said element is built of. This makes the incoupling element very durable and reliable and facilitates installation. Additionally, the element, optionally integrated with a light source, can be packed inside a protecting housing.

Additional illumination functions may be adopted in accordance with integrated light source features, such as related to unicolor- or multicolour illumination, for example. Moreover, special optical radiation ranges, such as IR- and/or UV-radiation, can be utilized for additional purposes, e.g. UV-C radiation for sterilization- and disinfection methods.

One of the principal purposes the light incoupling element according to the present invention is improving optical performance and efficiency of the lightguide and enhancing light distribution therethrough. The incoupling element enables an integrated control over the distribution of light propagation along horizontal- and vertical axes in the lightguide medium. The incoupling element can be used alone or in combination with an optical harmonizer tape. Provision of incoupling tape and light deflecting tape on the same lightguide elements may be beneficial for optimizing optical performance.

Along with improving optical performance of the lightguide, the incoupling element offers remarkable mechanical reliability and outstanding environmental durability.

The terms "optical radiation" and "light" are largely utilized as synonyms unless explicitly stated otherwise and refer to electromagnetic radiation within a certain portion of the electromagnetic spectrum covering ultraviolet (UV) radiation, visible light, and infrared (IR) radiation. In some instances, visible light is preferred.

In its broadest sense, the term "lightguide", "waveguide" or "optical waveguide") refers, in the present disclosure, to a device or a structure configured to transmit light therealong (e.g. from a light source to a light extraction surface). The definition involves any type of the lightguide, including, but not limited to a light pipe type component, a lightguide plate, a lightguide panel, and the like.

The expression "a number of" refers herein to any positive integer starting from one (1), e.g. to one, two, or three; whereas the expression "a plurality of" refers herein to any positive integer starting from two (2), e.g. to two, three, or four.

The terms "first" and "second" are not intended to denote any order, quantity, or importance, but rather are used to merely distinguish one element from another.

BRIEF DESCRIPTION OF DRAWINGS

Different embodiments of the present invention will become apparent by consideration of the detailed description and accompanying drawings, wherein:

FIGS. 1A-1I are cross-sectional views of a lightguide with an optical incoupling element 100 and related apparatus (unit) 250, according to various embodiments, attached to a lightguide.

FIG. 2A is a cross-sectional view of a multiphase incoupling element 100, according to the embodiment.

FIG. 2B is a cross-sectional view of an arrangement comprising two incoupling elements 100.

FIG. 3 shows various configurations for utilization of the incoupling element 100 on a lightguide (cross-sectional view).

FIGS. 4 and 5 show the incoupling element 100 with integrated cavity optics adapted for collimation, according to the embodiments.

FIG. 6 shows a light incoupling solution comprising the incoupling element 100 and an optical tape 10.

FIG. 7 shows a ray-tracing model for light incoupling be means of the incoupling element 100 optically connected to a planar surface of a lightguide.

FIG. 8A shows various configurations for a lightguide provided with the incoupling element 100 and the optical tape 10.

FIGS. 8B and 8C are comparison graphs illustrative of distribution of the incoupled light in a planar lightguide provided with the incoupling element only (FIG. 8B) and with the incoupling element together with the optical tape 10 (FIG. 8C).

FIG. 9 shows comparison graphs illustrative of vertical (A) and horizontal (B) distribution of the incoupled light in a planar lightguide provided with the incoupling element, according to an embodiment.

FIGS. 10A and 10B are comparison graphs illustrative of distribution of the incoupled light in a planar lightguide provided with the incoupling element configured as a tapered element without collimation optics in combination with the optical tape 10 (FIG. 10A) and provided with the incoupling element configured as a tapered element with collimation optics in combination with the optical tape 10 (FIG. 10B).

FIG. 11 illustrates different lightguide configurations (top view) with optical incoupling elements 100 or optical incoupling units 250 assembled on a lightguide surface.

DESCRIPTION OF EMBODIMENTS

Detailed embodiments of the present invention are disclosed herein with the reference to accompanying drawings. The same reference characters are used throughout the drawings to refer to same members. Following citations are used for the members:

100, 100-1, 100-2—an optical incoupling element;
100A—an element substrate;

100P1, 100P2—element modules, parts of a multiphase optical incoupling element;
101—an optical pattern;
102—optical (pattern) features/cavities with optically functional surfaces 1021, 1022, 1023;
103—contact areas within the element;
104, 105—three-dimensionally formed optical surfaces, wherein 104 is a topmost surface of the incoupling element, optionally, with a shaped region; and 105—a lateral end surface of the incoupling element facing an emitter device;
106—an additional shaped (wedge) profile;
107—a contact surface between the element and a lightguide;
In the element 100:
1011—an optically functional element structure;
1011A, 1011B—a substrate component with a patterned surface and an additional substrate component (layer), accordingly;
1012—an additional functional layer (an adhesive);
1013—an additional functional layer (external coating);
1015—an internal functional component (layer);
10—an optical tape (control over distribution of light propagation through the lightguide);
In the tape 10:
11—a pattern;
12—optical (pattern) features/cavities with optically functional surfaces 121, 122;
13—contact areas;
111—an optically functional layer;
111A, 111B—a patterned substrate layer and an additional substrate layer, accordingly;
112, 113—additional functional layers of the tape 10;
20—an optical waveguide (medium);
21—an outcoupling pattern;
30—an emitter device (a light source);
31—rays of emitted optical radiation;
32—rays of incoupled and/or redirected optical radiation;
33—rays of extracted electromagnetic optical;
250—an optical apparatus (unit).

FIG. 1A-1I illustrate, at 100, various embodiments of an optical incoupling element for an optical waveguide. Some basic configurations are shown on FIGS. 1A and 1B.

FIGS. 1A and 1B are cross-sectional views of an optical waveguide structure 20 with the optical incoupling element 100 (hereafter, the "incoupling element") attached on at least one surface of said waveguide. The optical waveguide, also referred to as a lightguide, is a structure configured to deliver optical radiation (light) emitted by at least one appropriate emitter device 30 towards a particular area that requires illumination. The lightguide is a planar (non-fiber) lightguide with essentially planar surface(s). In a basic lightguide layout (e.g. shown on any one of FIGS. 1A and 1B) one may distinguish a top surface, a bottom surface and two or more lateral (side) surfaces or edges. The top- and bottom surfaces form horizontal faces of the lightguide, whereas the edges extend essentially vertically, with optional inclination at a predetermined angle, between said top- and bottom surfaces along a path that surrounds the waveguide element when viewed as a two-dimensional shape (viz. along a perimeter). Longitudinal plane of said planar lightguide lies along its horizontal surface(s).

The lightguide comprises a light-transmitting carrier medium formed from optical polymer or glass. In exemplary embodiments, the lightguide (carrier) medium is polymethyl methacrylate (PMMA). For clarity, reference numeral 20 is used to indicate both the lightguide as an entity and the carrier medium said lightguide is made from.

In some embodiments, the incoupling element 100 is provided as a discrete, three-dimensional object having a predetermined shape, wherein the expression "three-dimensional" is used to indicate that the element 100 is rather solid than flat, as it can be measured in three different dimensions (length, width and height/thickness).

The element 100 can be installed on one side- or on both sides (top, bottom) of the planar lightguide. It is reasonable to install the element 100 on the same side of the lightguide that bears other optical structures, such as a light outcoupling/extracting layer, for example. Especially in window illumination it is beneficial to assemble all optical structures on the window surface facing the interior of a building or a space between the layered windows, due to environment factors.

Upon installation of the incoupling element on the lightguide, an optical contact is established at an interface between the lightguide medium 20 and the element medium (substrate) 100A. Optical contact may be established via mechanical connection or via bonding, by optically clear adhesive, for example. A surface of the element 100 forming the optical contact is indicated on FIG. 1A by reference number 107.

The element 100 comprises top- and bottom surfaces opposite to one another. In some configurations, the top- and bottom surface lie parallel to one another and parallel to a longitudinal (horizontal) plane of the planar lightguide (see FIGS. 1C, 1D). In some configurations, the incoupling element may comprise at least one surface or at least a portion of said at least one surface forming a shaped region.

In some configurations, such as shown on FIGS. 1A and 1B, the shaped region is formed with a topmost surface 104 of the element 100. The shaped region is thus defined with at least a portion of the topmost surface 104 of the incoupling element laid essentially opposite to a lightguide attachment surface. By virtue of its shaped region (e.g. surface 104), the element may be tapered. By tapered shape we refer to a gradual increasing or decreasing in size/thickness towards one end of the element. In practice, the taper is typically constructed with the element thickness decreasing towards the end of the element 100 disposed opposite relative to a lateral end 105 (FIG. 1B) facing the emitter device.

The tapered incoupling element 100 can thus have at least one surface or a portion of said at least one surface inclined (sloped without a curve) or curved (e.g. convex or concave) relative to the longitudinal plane of the planar lightguide.

The three-dimensionally formed optical surface, such as the topmost surface 104, can be referred to as an optical wedge. The element 100 with such optical wedge 104 may be configured for hybrid coupling, for example.

The emitter device or devices 30 is/are arranged essentially sideways relative to one of the lateral surfaces the incoupling element 100. The emitter 30 may be mounted on a lightguide surface or provided on a support (not shown). The emitter may be positioned at a predetermined distance relative to the incoupling element 100 or it may be brought into contact with said element and optionally attached thereto. In some configurations the emitter 30 is provided with a collimation device, such as a collimation lens. From the other hand, certain embodiments of the incoupling element 100 imply provision of collimation optics integrated in the element (see FIGS. 4, 5).

The incoupling element 100 is configured to receive and to incouple rays of optical radiation 31 (light) emitted from the emitter or emitters 30. The element 100 is further configured to adjust direction of incoupled light and to mediate light propagation (rays 32) through the lightguide medium towards light outcoupling area(s).

In some configurations, the optical element 100 incorporates an optical array (optical pattern). The pattern can be established with a number of features formed in the element substrate 100A and configured as optically functional cavities.

FIG. 1C is a cross-sectional view of the optical incoupling element 100, according to some embodiments. The incoupling element 100 comprises the substrate 100A and at least one pattern 101 formed with a number of pattern features 102 embedded in the substrate. Arrangement of pattern features 102 in the substrate is preferably periodic; however, provision of the pattern 101 as a non-periodic structure is not excluded. The features 102 are configured as optically functional cavities (viz. internal, embedded or integrated cavity optics). The latter are further referred to as "cavities" or "cavity profiles". The substrate 100A with the embedded pattern(s) 101/embedded cavities 102 forms an optically functional element structure 1011 optionally configured as a layer.

The internal cavities 102 are filled with a filling material having a refractive index different from the refractive index of the material of the substrate surrounding the cavity.

In some configurations, the cavities 102 are filled with a low refractive index material. Additionally or alternatively, the cavities may be provided with a low refractive index coating. In some configurations, the cavities 102 are filled with air to establish an embedded air-cavity optics solution. Overall, the filling material for said cavities can be established with any one of: a gaseous medium, including air or other gas, fluid, liquid, gel, and solid.

The low refractive index material is a material typically having the refractive index within a range of 1.10-1.41. Refractive index of the low $R_i$ material is typically below 1.5; preferably, below 1.4. In an event the cavities 102 are filled with low $R_i$ medium or comprise a low $R_i$ coating, for example, the embedded pattern can be rendered with an optical filter functionality, defined as a capability of changing the spectral intensity distribution or the state of polarization of electromagnetic radiation incident thereupon. The filter may be involved in performing a variety of optical functions, such as transmission, reflection, absorption, refraction, interference, diffraction, scattering, beam splitting and polarization.

The optically functional structure 1011 with embedded pattern 101 is formed with at least two substrate components 1011A, 1011B. In configuration shown on FIG. 1C these components are provided as at least two (sub)layers. A first substrate component 1011A comprises an essentially flat, planar surface with at least one cavity pattern formed therein. In configuration of FIG. 1C the first substrate component 1011A is provided as a flat, planar layer of substrate material having uniform thickness, in which at least one cavity pattern has been formed. To establish internal cavities and to form an embedded optical pattern, the first substrate component with a patterned surface is brought against an entirely flat, planar surface of a second substrate component 1011B such, that at least one embedded cavity pattern 101 with embedded cavities 102 alternating with flat junction areas 103 is formed at an interface between the patterned substrate surface of the first component 1011A and the entirely flat, planar surface of the second substrate component 1011B.

The boundary between the substrate components or layers 1011A, 1011B is not indicated to emphasize an essentially "one-piece" nature of the optically functional element structure 1011 with the embedded cavities 102.

In some configurations, the second substrate component 1011B is provided as an entirely flat, planar layer of substrate material having uniform thickness.

In some configurations, at least the first substrate component 1011A with a patterned surface is formed from a substantially optically transparent material (e.g. 100A). The second component 1011B can be formed from an optically transparent material and/or coloured material. The substrate components 1011A, 1011B can be made from the same substrate material and/or the substrate material with essentially same refractive index. Alternatively, the substrate components can be made from different materials, the difference being established in terms of at least refractive index, transparency, color and associated optical properties (transmittance, reflectivity, etc.). For example, the entire optically functional element structure 1011 (comprising both 1011A, 1011B) can be made of a substantially optically transparent substrate material, such as transparent polymer or elastomer, UV resin and the like. Alternatively, the components 1011A, 1011B can be made of different materials, having different refractive indices, accordingly.

In the optical pattern 101, the areas of substrate material alternating with the cavities 102 form contact areas or contact points between the structural components (1011A, 1011B), and optionally between the optically functional element structure 1011 and a number of additional layers (see 1012, 1013, FIG. 5). In certain conditions, the areas 103 form so called light passages, through which light is internally transmitted within the element 100. Light passages are formed when the substrate material 100A is an essentially light-transmitting carrier medium. The pattern 101 thus comprises a number of embedded cavities 102 having contact points/light passages 103 in between.

In some embodiments, such as shown on FIG. 1C, the incoupling element 100 is formed with the optically functional structure 1011 alone. Such incoupling element consists of the structure 1011, optionally configured as a layer, having the pattern(s) 101/(air)-cavity profiles 102 totally embedded inside the substrate material (with no prominent pattern features established on external surfaces).

FIG. 1D illustrates a configuration, in which the incoupling element 100 is implemented with a number of embedded patterns 101 (101-1, 101-2) arranged in stacked configuration. Configuration includes joining two or more optically functional element structures/layers 1011 (1011-1, 1011-2) together to form a multilayer solution in a single element. In such configuration, the patterned layers 1011A may alternate with the flat substrate layers 1011B.

In some instances, the element 100 may be formed with a stack comprising two or more patterned layers (referenced as 1011A) positioned on the top of each other. Flat, planar interface between the layers may thus be established by virtue of said patterned layers 1011A alone (requires that the layer has a pattern established in one of its surfaces, the other surface remaining entirely flat). The topmost patterned layer may further be provided with the entirely flat substrate layer (referenced as 1011B) to complete the multilayer structure and to enable full encapsulation of the pattern(s).

The stack may thus be implemented with any one of: the patterned layer(s) (1011A) optionally alternating with entirely flat substrate layers (1011B); and the optically functional layers (1011). The patterns located at different levels in the stack may be configured to perform same of different optical function related to incoupling- and adjusting direction of light received thereto, wherein said optical function is selected from a group consisting of: an incoupling function, a reflection function, a redirecting function, a deflection function, an absorption function, a transmittal function, a collimation function, a refraction function, a diffraction function, a diffusion function, a polarization function, and any combination thereof.

FIG. 1E illustrates an exemplary embodiment of the element 100 with a topmost surface inclined at a predetermined angle. The element thus comprises the embedded cavity pattern 101 formed by the patterned component 1011A and the entirely flat, planar component 1011B. The patterned component 1011A is imparted with a predetermined shape (to form a triangle at a cross-section, for example) and the component 1011B provided as a flat, planar layer component of uniform thickness, such as a coating or a film, is laminated on the top of the patterned component, whereby the embedded cavities 102 are formed.

In present configuration, the patterned component 1011A is made of substantially optically transparent substrate material 100A. The topmost flat component 1011B is formed with different material, such as a low refractive index (low $R_i$) material, for example. By joining the layer made of low $R_i$ material to the patterned component, Total Internal Reflection (TIR) efficiency for the critical angle of incident light can be improved.

FIG. 1F shows the element 100 comprising the substrate 100A and an optical tape 10 attached thereto. The tape 10 is a so-called harmonizer tape predominantly rendered with a light incoupling- and redirecting function, similar to the optical function performed by the element 100. Optical (air)-cavity pattern(s) is/are integrated inside the tape 10. Configuration may optionally include provision of the optical pattern or patterns 101 in the substrate 100A, in a manner described relative to FIG. 1E.

FIG. 1G shows the element 100 comprising the substrate 100A and the optical tape 10 positioned under the element (between the element 100 and the lightguide 20). FIG. 1G demonstrates an example of utilization of the light incoupling- and redirecting tape 10 for enabling an optical contact between the incoupling element 100 and the lightguide medium 20.

Overall, the configurations shown on FIGS. 1F and 1G involving provision of the incoupling tape 10 also perform a dual-phase function, such as incoupling light into a lightguide and redirecting incoupled light with preferred angle distribution, e.g. collimating light. The tape 10 may be configured for a number of optical functions, such as collimation, linear diffusion, polarization, and the like. The tape is simple to assembly and utilize.

FIG. 1H illustrates the optical incoupling element 100 comprising an integrated emitter device 30 (a light source). The emitter device can be fully or partly integrated inside the substrate material 100A forming the incoupling element 100. The emitter 30 may be embedded inside the optical incoupling element by direct casting or by post-installation, in order to maximize light incoupling efficiency. The incoupling element 100 with the integrated, embedded emitter device 30 may be further described as an optical apparatus/a unit 250. The element 100 of any other shape can be provided with the integrated emitter device.

FIG. 1I illustrates the incoupling element 100 combined with the emitter device 30 in conventional manner. The optical unit 250 comprising the incoupling element 100 and the light source 30 is thus established. The unit 250 may further comprise a housing arranged around the element 100 and the emitter 30. The element 100 and the emitter 30 integrated in the unit 250 are optionally encapsulated within the housing. The housing is optionally open at a side of placement of the element on the lightguide surface (viz., the optical contact surface 107). The unit 250 has height (h) of about 0.5-10 mm and it can incorporate the element 100 of any appropriate length/width. The established unit offers robust and reliable incoupling solution for easy and fast installation and utilization. The unit 250 may be provided without a housing.

The optical unit 250 thus comprises at least one incoupling element 100 and an at least one emitter device 30 configured to emit optical radiation incident on the optical pattern(s) 101 in said element. The unit 250 thus provides a compact solution, in which a light source(s) is integrated with the (incoupling) optics.

A plurality of light sources can be integrated into the same unit. Said light sources can be controlled separately and/or in combination. An arrangement involving at least two light sources enables adaptation of additional illumination features, such as related to unicolor- or multicolour illumination, for example. Moreover, IR- and/or UV-radiation can be utilized for additional purposes, e.g. UV-C radiation for sterilization- and disinfection methods. The unit 250 can incorporate the element of any other shape.

FIGS. 1H and 1I thus illustrate formation of the optical unit 250 with internal- and external light sources, accordingly.

In all configurations (FIGS. 1A-1I), the element 100 and/or the unit 250 may comprise means for a lightguide attachment, such as an adhesion layer.

In terms of size-related parameters (length, width, height/thickness, slope, curve), the element 100 and/or the unit 250 can be configured such, as to achieve optimal performance efficiency.

It is preferred that the incoupling element 100 has uniform exterior surfaces, without any surface relief patterns or related structures formed thereon. However, present technology does not exclude manufacturing of relief patterns (open cavity patterns). By virtue of being void of any protruding or relief parts, the incoupling element or an exterior surface thereof, when attached to the lightguide, can thus be handled without incurring damages on the element optics and on a light source.

The element 100 can be configured as a discrete, three-dimensional item rendered with a predetermined optical function by its shape, provision of the optical contact surface(s) 107, and optionally provision of the optical harmonizer tape 10 (e.g. FIGS. 1A, 1B. 1F, 1G, 1H, 1I). In some instances, the element 100 may comprise optical pattern(s), such as embedded optical pattern(s) (e.g. FIGS. 1C-1E). Nevertheless, any configuration shown on FIGS. 1A-1I may be provided with embedded optical pattern(s) 101.

FIG. 2A is a cross-sectional view of the incoupling element 100 in a multiphase configuration. The element 100 comprises at least two adjacent functional zones P1, P2 (Phase 1, Phase 2). Each said zone independently configured to perform the optical function related to incoupling light incident thereto and adjusting direction of the incoupled light such, that the incoupled light is (re)directed into the lightguide medium 20.

FIG. 1A shows formation of said functional zones by separate element modules 100P1, 100P2, accordingly. The modules are interconnected by means of an interfacial layer 1015, optionally, an adhesive. The interfacial layer may be formed by simple mechanical connection between the modules 100P1, 100P2.

Configuration of FIG. 2A enables more efficient light coupling with a predetermined light angle distribution. The first phase P1 (module 100P1) can be configured to incouple incident light and to redirect at least a part of said incident light into the lightguide medium with preferred angle distribution. The second phase P2 (module 100P2) can be configured to supplement the optical function of P1, by incoupling light rays leaked from P1 and by redirecting said leaked light back into the lightguide medium to achieve preferred light distribution.

P1 and/or P2 can be configured for (in)coupling light arriving at predetermined angles of incidence. The multiphase incoupling solution improves incoupling efficiency and allows for managing light incident at specific angles (relative to the normal of a surface, onto which light is incident to).

Zonal/modular implementation is not limited to a tapered shape configuration shown on FIG. 2A. Any other configuration, e.g. a rectangular, planar element shown on FIG. 1C, can be provided as a modular solution.

The first phase element module 100P2 and the second phase element module 100P2 can differ from one another in terms of at least size and/or shape (see FIG. 2A showing the modules 100P1, 100P2 having different shapes). Additionally or alternatively, difference between the element modules can be established by means of incoupling optics, the latter defined by variable configuration and/or arrangement of internal cavities, described further below. Hence, the element modules 100P1, 100P2 may bear the same size and/or shape and differ from one another only by virtue of embedded incoupling optics.

In some instances, the interfacial layer 1015 between the modules 100P1, 100P2 is provided as a low $R_i$ adhesive layer. By means of the low $R_i$ interfacial layer, TIR effect can be achieved at an interface between the element modules.

FIG. 2B is a cross-sectional view of an arrangement comprising at least two discrete incoupling elements 100-1, 100-2 arranged on the lightguide medium 20. The arrangement may include the incoupling elements according to what is shown on FIGS. 1A-1I and FIG. 2A. The elements in the arrangement may be identical or different. The elements 100-1, 100-2 can be arranged mirror-symmetrically with regard to one another, in a manner shown on FIG. 2B, to incouple light from at least one light source. A bi-directional light incoupling solution enables controlled light propagation in different directions relative to a position of the light source. Configuration may utilize one or more emitter devices (e.g. one emitter device with 360° emission or two or more emitter devices configured to emit light in a predetermined direction). The elements 100-1, 100-2 may be positioned mirror-symmetrically with regard to an array of emitter devices, in a manner shown on FIG. 4 (image B).

The arrangement of FIG. 2B may be modified such that the elements 100-1, 100-2 may be arranged at a rotation angle of e.g. 90 degrees relative to one another around an imaginary rotation axis formed by a location of the emitter device 30. Any other appropriate disposition of the elements 100-1, 100-2 around the emitter device 30 can be conceived.

FIG. 3 shows, at (i)-(iv), various layouts for the optical incoupling element 100 on the lightguide 20. Layout (i) is essentially the same as the one shown on FIG. 1B. Layouts (ii) and (iii) show provision of the incoupling element 100 on a planar lightguide medium with a conventional single-sided light out-coupling pattern 21 (ii) and with a conventional dual-sided light out-coupling pattern 21 (iii). Layout (iv) shows provision of the element 100 on a planar lightguide medium having a single-sided- or a dual-sided light outcoupling patterns 21 configured with embedded cavity optics (while a single-sided configuration is not particularly shown, it can be easily conceived based on FIG. 3, ii).

The optical out-coupling pattern 21 can be integrated into the lightguide medium by replication, for example, or provided in the form of a coating or a tape applied on the surface of the lightguide.

In all options (i)-(iv) the incoupling element 100 can be provided at one side of the planar lightguide medium or at two sides. Additionally or alternatively, the unit 250 can be utilized.

As discussed with reference to FIGS. 1C, 1D and 1E, the optical pattern 101 may be formed along and across the topmost surface 104 of the incoupling element. Mentioned configurations involve a planar surface 104, with uniform height (thickness) or inclined at a predetermined angle. By virtue of surface planarity, the essentially planar cavity array (pattern 101) may be manufactured to occupy the most of the square surface of a topmost side 104 of the incoupling element. FIG. 1A may employ a similar cavity pattern arrangement. The topmost surface 104 of the element 100 is thus rendered with a light incoupling function and a light distribution control function(s) and forms a primary light incoupling surface of the element 100.

Such solution is the most feasible for the element 100 formed with planar, optionally inclined structural components (1011, 1011A, 1011B).

For the incoupling element involving essentially curved surface 104 and/or other curved surfaces (FIGS. 1B, 1G, 1H, 1I, 2A (100P1), 2B), provision of a cavity pattern along and across the entire square surface of the topmost side may be more labour-intensive in view of a manufacturing (lamination) setup.

FIGS. 4 and 5 demonstrate the incoupling element 100 with the embedded optical pattern 101 arranged against a lateral end surface 105 of the optical element facing the emitter device 30. In the element 100 shown on FIGS. 4, 5 the primary light incoupling surface is thus established by the three-dimensionally formed lateral end surface 105.

Upon manufacturing of the element 100 according to FIGS. 4, 5 the substrate component with a planar, patterned surface is joined, optionally by lamination, with the substrate component with a planar, flat surface, whereby an embedded cavity pattern 101 is created.

In present configuration, the optical interface (101, 102) is thus developed on a plane lying essentially along a vertical axis (i.e. essentially perpendicularly to the horizontal plane defining position of the lightguide). To compare, in configurations involving the topmost surface 104 as the primary light incoupling surface, the optical interface (101, 102) is developed on a plane lying essentially along a horizontal axis (i.e. essentially parallel to the plane defining position of the lightguide including the necessary inclination angle correction).

Provision of the optical pattern as shown on FIGS. 4 and 5 is particularly suitable for constructing integrated collimation optics, e.g. embedded cavity optics for conical light collimation (horizontal).

On FIG. 4, a taper direction (indicative of a downhill) is indicated with an arrow (surface 104).

FIG. 5 shows the tapered element 100 with the pattern 101 adapted for a collimation function. Images B and C demonstrate the element 100 with embedded collimation cavities 102 having different length/height. In option B, the collimation cavities 102 are shorter in comparison to a distance between the top- and bottom surfaces of the element 100 (viz, height or thickness of said element); while in option C, the cavities extend essentially through the entire element. The cavities are entirely embedded.

Additional optical performance can be achieved by implementing cavity profiles, e.g. longitudinal grooves, on the topmost surface (104) of the taper 100 (see FIG. 1E, where V-groove shaped cavity profiles are shows at a cross-section). Collimation solution may further involve provision of e.g. reflective layers on certain surfaces of the embedded (air)-cavities.

By modifying pattern- and cavity-related parameters, other optical functions, in addition to or alternatively to the collimation function can be achieved.

Overall, provision of the optical patterns 101 along and across the three-dimensionally formed optically functional surfaces 104, 105 may vary between the embodiments. Any one of the elements and/or the element modules (FIG. 2A) may be implemented with the optical pattern(s) positioned along any one of the surfaces 104, 105, or both. For example, the modular solution (FIG. 2A) may involve the first element module (100P1) comprising the first pattern 101 placed along the surface 105, and the second element module (100P1) comprising the second pattern 101 placed along the surface 104.

In this regard, in addition to the primary incoupling surface, a secondary incoupling surface may be identified in the element 100. By way of example, if the primary incoupling surface is formed with the embedded optical patterns 101 provided at the lateral end surface 105 (FIG. 4, 5), the secondary incoupling surface may be formed with the embedded optical patterns 101 provided at the surface 104 and/or the pattern integrated into the optical incoupling tape 10, according to what is shown on FIGS. 1F and 1G.

Alternatively, mentioned surfaces 104, 105 and the element 100 may be implemented without the patterns.

For the purposes of the invention it is essential that light arrives onto at least one three-dimensionally formed optical surface 104, 105 and optionally onto the optical pattern or patterns 101 from a direction essentially parallel to the longitudinal plane of the planar lightguide (i.e. light travels in a direction essentially along the length of said lightguide). This is achieved by placing the emitter device(s) 30 against the lateral end surface 105 of said element (while the element 100 is positioned on the lightguide). Emitted light enters the element essentially through the lateral end surface 105 and is incident onto the optical surface(s) 104, 105 and optionally the optical pattern(s) 101 from a direction essentially parallel with the plane of the lightguide. The lateral end surface 105 may incorporate the optical pattern and serve as a primary incoupling surface (FIGS. 4, 5).

The element is configured and arranged on the lightguide such, that essentially all light emitted by the emitter device(s) enters into the optical incoupling element and that essentially all light received by the incoupling element become incoupled into the lightguide. Light emitted by the emitter device(s) thus enters into the optical incoupling element and does not enter into an edge (or an end) of the lightguide.

In addition to the light incoupling surfaces 104, 105, the element 100 may comprise an additional shaped profile 106 (FIG. 5; A, B, C). The profile 106 may extend along about 20-40%, preferably, about 30% of the length of the element 100 (viewed in horizontal direction along the longitudinal plane of the lightguide). The profile 106 may be implemented as a wedge between the element surface facing the lightguide (viz., the optical contact surface 107) and the lightguide medium 20. Wedge format allows for improved light management and improved light redirecting properties and accounts for improvements in optical efficiency by about 10%. With an angular wedge profile 106, the upper surface of the wedge defined by the lower surface of the element 100 is positioned at a predetermined angle with regard to the lightguide surface (as shown on FIG. 5). Alternatively, the profile 106 may have an entirely flat surface without forming an optical contact on the lightguide surface. The wedge profile 106 may be a profile defined with an air medium or with any other low $R_i$ medium. The profile 106 may be further coated with a suitable coating material, e.g. a low $R_i$ coating.

In addition to the optically functional element structure 1011 discussed hereinabove, the incoupling element 100 can be provided with a number of additional functional layers, such as a base layer designated on FIG. 5 as 1012 (see images A, B) and a topmost layer designated as 1013 (see image D). In similar manner, the layers 1012, 1013 may be arranged at one of both sides (top-, bottom) of the element implemented as shown on FIGS. 1A-1I, 2A and 2B. These layers render the element 100 with a number of additional functions.

By way of example, the base layer 1012 may be configured as an adhesive layer to enable attachment, by adhesion, to the underlying lightguide medium. The adhesive layer 1012 may be provided as an optically clear adhesive (OCA) or a liquid optically clear adhesive (LOCA). Said optical clear adhesive layer may be established by acrylic or silicone based adhesive. The adhesive layer is typically provided at a bottom surface of the element 100, but provision of said adhesive on any surface of the element or on both surfaces (top, bottom) is not excluded.

By means of the base layer 1012 provided as optically clear adhesive (OCA) layer, the incoupling element is set into optical contact with the lightguide 20. The contact interface is advantageously established by a planar surface of said lightguide and the optical contact surface 107 of the element optionally supplied with the adhesive layer 1012.

The topmost/external layer 1013 may be provided as a functional outer layer configured as any one of: an optically transparent layer, a non-transparent layer, a specular or diffusive reflector layer, a low refractive index ($R_i$) layer, and the like. Alternatively, the topmost layer 1013 can be configured as an adhesive layer, similar to that of the base layer 1012.

In some configurations, the optical incoupling element is configured to perform a cooperative multi-function, wherein light directivity and wavelength management are executed, for example, by an integrated wavelength conversion layer, wherein monochromatic light, such as blue LED light, for example is partially or fully conversed.

In some configurations, the optical incoupling element comprises an additional functional layer (1012, 1013) configured as a wavelength conversion layer for partial or full conversion of monochromatic light, such as blue (LED) light, for example. The wavelength conversion layer can be arranged on a top- and/or bottom surfaces of the lightguide. In the latter event, the wavelength conversion layer can be arranged together with the adhesive layer and to form an optical connection with the lightguide. The layer with this additional conversion function can be utilized at the edge of the lightguide or on the planar area (light distribution area of said lightguide).

Alternatively or additionally, the wavelength conversion layer can be utilized with the incoupling (harmonizer) tape 10.

By way of example, any one of the additional layers (e.g. 1012, 1013) can be configured as a black layer to absorb a portion of light passed through the light passages (103) forming the contact points at an interface between the layers. A black layer coating may be provided on a backside of the optical element, for example. In another exemplary configuration, the additional layer(s) can be optically transparent layer for transmission of light through the contact points 103 at the interface between the layers (1011, 1012 and 1013). As discussed above, the contact points (light passages) are formed by the substrate areas 103. In similar manner, any one of the additional layers can be configured as a reflector layer, wherein the material of said layer may be adopted for specular reflection, Lambertian reflection or provided as any other reflective non-transparent material.

One special solution includes utilization of a low refractive index ($R_i$) layer as a topmost additional functional layer 1013. Indicated solution typically enhances light intensity distribution/light harmonizing efficiency by about 6%-20% depending on the fill factor of the interconnection points (contact areas 103) and their shape.

More than one additional layer may be provided at top- and/or bottom surfaces of the element. Thus, in addition to the adhesive layer 1012, the bottom side of the element 100 may be provided with a black layer or a low $R_i$ layer, for example (not shown). Described configurations should be adjusted on a case-by-case basis, taking into account position of the element 100 on the lightguide medium and provision of the element as a small-sized discrete element or as an elongated, continuous entity, such as a band or a strip, for example.

FIG. 6 illustrates a combined light incoupling solution employing the incoupling element 100 and the harmonizer tape 10 positioned on the lightguide 20 subsequently to the incoupling element 100 (relative to the emitter 30).

The tape 10 is described herein below. The optical tape 10 shown on FIG. 6 can be generally utilized in solutions described relative to FIGS. 1F, 1G. By modifying pattern- and cavity-related parameters, the tape 10 can be rendered with a predetermined, distinct optical functionality. Thus, tape configurations shown on FIGS. 1F, 1G and involving the tape 10 provided on the top of the element 100 and/or between the element 100 and the lightguide, can be advantageously utilized in light incoupling and redirecting; whereas tape configuration shown on FIG. 6 is particularly suitable for light distribution control.

Hence, while the harmonizer tape 10 rendered predominantly with the incoupling function (e.g. used in a manner shown on FIGS. 1F and 1G) is referred to as an "incoupling tape", the harmonizer tape 10 rendered predominantly with the light distribution control function is referred to as a "deflection tape".

In structural terms, the deflection tape 10, in turn, largely follows the principles described hereinabove relative to the element 100. The tape 10 comprises an optically functional layer 111 with at least one embedded pattern 11 formed in a substrate 10A. The optically functional layer 111 is formed from the (sub)layers 111A, 111B. A first substrate layer 111A comprises an essentially flat, planar surface with at least one cavity pattern formed therein (hereafter, a patterned layer). The patterned layer 111A may be provided as a flat, planar layer of substrate material having uniform thickness, in which at least one cavity pattern has been formed. To establish internal cavities and to form an embedded optical pattern, the first substrate layer with a patterned surface is brought against an entirely flat, planar surface of a second substrate component 111B such, that at least one embedded cavity pattern 11 with embedded cavities 12 alternating with flat junction areas 13 is formed at an interface between the patterned substrate surface of the first layer 111A and the entirely flat, planar surface of the second substrate layer 111B.

Multilayer configurations may be conceived by arranging the patterns 11 (layers 111, tapes 10) into stacks, in similar manner as described hereinabove with reference to the element 100. The embedded pattern 11 comprises embedded (air)-cavities 12 alternating with flat junction areas 13 optionally forming light passages. Formation of light passages from the junction areas depends on refractive indices of substrate materials forming the sublayers 111A, 111B and provision of any interfacial coatings between said sublayers. Thus, the sublayers 111A and 111B may be formed of same substrate material 10A, or different materials.

The tape 10 may further comprise an additional functional layer or layers 112, 113, corresponding by its function to the additional functional layers 1012, 1013 of the element 100 (see FIG. 5). The tape 10 may have the base layer 112 and optionally the top layer 113 provided as an adhesive layer to mediate attachment of the tape to the lightguide medium and/or to the underlying element substrate (see configuration of FIG. 1G).

Utilization of the tape 10 in combination with the incoupling element 100 improves light distribution through the lightguide, especially in vertical axis, but also in horizontal axis. Depending on tape configuration and pattern design, light distribution inside the lightguide may be controlled (narrowed or widened) with high precision.

Optical functions of the tape 10 are adjustable in terms of cavity-related parameters and tape-related parameters (e.g. substrate materials, overall implementation, etc.), as described herein above. Overall, provision of the harmonizer tape 10 enables improved internal light distribution uniformity in the lightguide (mediated by enhanced TIR functionality enabled by the harmonizer tape 10).

The incoupling element 100 optionally in combination with the harmonizer tape 10 incouples optical radiation emitted from at least one emitter device 30 and adjusts direction of optical radiation rays incident on the three-dimensionally optical (incoupling) surface(s) 104 and/or 105, optionally provided with the pattern(s) 101. It is essential that light arrives onto the incoupling surface(s) and the optical pattern or patterns 101 from a direction essentially parallel to the longitudinal plane of the planar lightguide. To achieve that, the emitter device(s) 30 is/are placed on the lightguide against the lateral end surface 105 of said element (i.e. not above- or below the element positioned on the lightguide). Emitted light enters the element essentially through the lateral end surface 105 and is incident onto the optical pattern(s) 101 from a direction essentially parallel with the plane of the lightguide. The lateral end surface 105 may incorporate the optical pattern (FIGS. 4, 5).

By virtue of its at least one three-dimensionally formed optical surface (104, 105), the element 100 is configured to incouple light incident thereto and to adjust/modify direction of the incoupled light transmitted through the optical contact surface 107 established at an interface between the element substrate 100A and the lightguide medium 20 such, that the incoupled light acquires a propagation path through a lightguide medium via a series of total internal reflections.

In particular, but not exclusively, in configurations involving a solid, discrete element void of cavity patterns, the incoupled light is redirected at an interface between the three-dimensionally formed incoupling surfaces 104 and/or 105 and the ambient and/or at the interface between the element substrate 100A and the lightguide medium 20 (the latter formed by the optical contact surface 107) to acquire the propagation path through the lightguide medium, whereupon an angle of incidence at an interface between the lightguide medium and the ambient is/are larger than or equal to a critical angle of total internal reflection.

Additionally or alternatively, the element 100 is configured to adjust/modify direction of light received thereto such, that light incident on the pattern or patterns 101 is deflected and redirected to acquire a propagation path through a lightguide medium 20 via a series of total internal reflections. Provision of the optical tape 10 subsequently to the element 100 enables controlling light distribution inside the lightguide 20 in a more efficient manner.

The pattern(s) 101 (element 100) and optionally the pattern(s) 11 (tape 10) are therefore designed such that by virtue of said pattern(s), the element 100 and the tape 10 is/are configured to mediate incoupled light propagation through the lightguide medium towards the out-coupling area(s) 21 and to control distribution of light propagating through the lightguide 20.

Overall, direction of light arriving on and incoupled by the element 100 (by the incoupling surfaces 104, 105 optionally containing the pattern(s) 101 located on any one of the primary- and secondary incoupling surfaces) is adjusted such, as to acquire an initial propagation path through the lightguide (via TIRs). To further support and control light distribution through an entire length of the lightguide in a most efficient manner, the lightguide 20 can be provided with the optical tape 10. FIG. 7 shows a ray-tracing model for light incoupling on the lightguide 20 by utilizing the incoupling element 100 and the tape 10 optically connected (adhered) to a planar surface of the lightguide 20.

Hence, light 31 received at the element pattern(s) 101 is incoupled and (re)directed at the interface between each cavity 102 and the material of the substrate 100A surrounding the cavity. The pattern 101 and the features (cavities) thereof thus perform an optical function or a group of functions related to incoupling- and adjusting a direction of light received thereto. Incoupled and (re)directed light 32 acquires a propagation path through the lightguide medium, whereupon an angle of incidence at the interface between each cavity and the material of the substrate surrounding the cavity is/are larger than or equal to a critical angle of total internal reflection.

The optical function related to controlling distribution of light propagating through the lightguide medium is further supported and controlled by the optical tape pattern(s) 11.

Any one of the element pattern 101 and the tape pattern 11 is rendered optically functional by providing each individual cavity or a group of cavities in the pattern with a number of parameters, including, but not limited to: dimensions (size), shape, cross-sectional profile, orientation and position in the pattern, fill factor and periodicity.

A fill factor (FF) defined by a percent (%) ratio of the optical features (102 in the element 100; 12 in the tape 10) per a unit area is one of the key parameters in designing optical solutions. Fill factor defines a relative portion of the features 102 in the reference area (e.g. a pattern or any other reference area).

The cavity features can be further characterized by a number of parameters, such as length, width (top width, bottom width) and height of the feature, as well as with a length of a period and a slope angle.

A primary optical function performed by the optical incoupling element 100 optionally in combination with the optical harmonizer tape 10 is thus to incouple light arriving onto the incoupling surfaces 104, 105 optionally containing optical pattern(s) 101, 11 along a horizontal direction (parallel with the lightguide 20) and to mediate propagation of the incoupled light inside the lightguide medium with predetermined angle distribution. Any one of the element 100 and the tape 10 may be positioned under the lightguide medium and/or on the top of the lightguide medium.

The following description relates to the optical element 100. Similar provisions are also applicable to the optical tape 10; therefore, further description of tape-related cavity patterns is omitted.

Each individual cavity in the pattern thus constitutes a profile having a number of optically functional surfaces. By way of example, optically functional surfaces 1021, 1022, 1023 (hereafter, a first optically functional surface, a second optically functional surface and a third optically functional surface, accordingly) are schematically shown on FIG. 4 (image A). Each of said surfaces is established at the boundary interface between the cavity 102 and the surrounding substrate medium 100A. In fact, all surfaces in the cavity may be rendered optically functional.

The optically functional surface or surfaces is/are thus established by any surface or surfaces formed at the interface between each cavity and the material of the substrate surrounding the cavity.

In some configurations, each said optically functional surface or surfaces in each individual cavity in the pattern is/are established with any one of: a low refractive index reflector, a polarizer, a diffuser, an absorber, or any combination thereof. Thus, any one of the optically functional surfaces (1021, 1022 and 1023) can be provided with an appropriated coating, such as a low $R_i$ coating. The coating may be applied during manufacturing stage.

As mentioned above, one of the major functions of the optical incoupling element 100 is incoupling- and (re)directing of light incident on the pattern at an angle of incidence larger than or equal to a critical angle of total internal reflection. An optical function performed by the element is applied to light incident on the pattern (incident at the interface between the cavities and the surrounding medium. The incident light is incoupled and further redirected from its original propagation path by a certain angle by means of (air)-cavity optics embedded inside of the element.

In addition to regulating distribution of said TIR-mediated light propagation through the lightguide medium, the element 100 is configured to perform a number of additional optical functions, wherein a particular function or a combination of functions is determined by a number of factors, including cavity- and surrounding material related parameters, such as configurations of cavity profile(s) in the pattern and selection of materials (e.g. substrate material forming the optically functional layer 1011, material of the additional layers 1012, 1013, cavity filling material).

In the element 100, the at least one pattern is configured to perform an optical function related to incoupling light emitted from at least one emitter 30 and adjusting a direction of light received thereto, wherein said optical function includes, but is not limited to: a reflection function, an absorption function, a transmittal function, a collimation function, a refraction function, a diffraction function, a polarization function, and any combination thereof.

The cavities in the patterns perform the optical function or functions individually or collectively. Thus, the pattern may be configured such that all cavities in the pattern perform the same function (collective performance). In such an event, the pattern may comprise same (identical) cavities. Alternatively, each individual cavity 102 in the same pattern can be designed to establish an at least one optical function related to adjusting the direction of light received thereto. This is performed by adjusting (at design and manufacturing stage) cavity-related parameters, such as dimensions, shape, cross-sectional profile, orientation, position, periodicity, fill factor etc., as described above. The element 100 can comprise a number of patterns, with each pattern comprising features/cavities differing from the features/cavities of any other pattern(s) in the element by at least one parameter.

In the element 100, the pattern or patterns are configured variable by a number of cavity-related parameters, wherein the number of cavity-related parameters comprises an individual parameter or any combination of parameters selected from the group consisting of: dimensions, shape, cross-sectional profile, orientation, position and periodicity.

In the element 100, the cavities are thus established with two-dimensional- or three-dimensional pattern features having cross-sectional profiles selected from the group consisting of: linear, rectangular, triangular, blazed, slanted, trapezoid, curved, wave-shaped and sinusoidal profiles.

Achieving the incoupling and (re)directing function is assisted by provision of the light passage areas 103 between the cavities 102 (FIG. 1C). Configuration of said light passages largely depends on configuration of the cavities and on the arrangement of said cavities in the pattern, however, e.g. light transmission property can be controlled and optimized by choice of substrate material.

Incoupled light with an optical redirecting function applied thereto (i.e. incoupled light rays whose direction is adjusted via interaction with the cavity pattern), also referred to as deflected and/or (re)directed light (32, FIGS. 1A-1I, 3) acquires a propagation path through a lightguide medium 20 via a series of total internal reflections.

The pattern(s) 101 in the element 100 can be further adjusted such that light is incident on said pattern(s) at an angle of incidence at the interface between each cavity in the pattern and the material of the substrate surrounding the cavity is/are larger than or equal to a critical angle of total internal reflection. By such an arrangement, direction of light received at the element 100 and at the pattern(s) 101 (from the direction essentially parallel to a longitudinal plane of the planar lightguide 20) is modified at the interface between each cavity in the pattern and the material of the substrate surrounding the cavity to acquire the propagation path through the lightguide medium, whereupon an angle of incidence at an interface between the lightguide medium and an ambient, and, optionally, an angle of incidence at the interface between each cavity and the material of the substrate surrounding the cavity is/are greater than or equal to a critical angle of total internal reflection.

By provision of the incoupling element 100 optionally combined with the deflection tape 10 placed subsequently to the element 100, direction of incoupled light is further adjusted such that light arrives on a plane of the boundary (interface) between the lightguide medium and the ambient and, optionally, between each cavity and the substrate medium surrounding said cavity, at the angle of incidence greater than or equal to the critical angle of total internal reflection.

For clarity, the term "deflection" is used hereby primarily with regard to incoupled light rays whose direction is adjusted/modified at the element 100 and/or any at the tape 10 (i.e. modified to deviate from its original path, as emitted by the emitter), whereas the term "(re)directing" is applied both to light rays deflected (re-directed) at the tape and light rays that have acquired a propagation path through the lightguide via a series of TIRs after they have been deflected at the tape. Both deflection- and (re)direction functions aim at adjusting direction of optical radiation rays as a result of light interaction with interface/boundary materials (e.g. air-plastic). Interaction occurs, in turn, through a number of optical functionalities, such as reflection, refraction, etc.

Light is total internally reflected at the cavities 102 upon arriving on the pattern at a range of angles of incidence. The cavities 102 can thus be configured, in terms of the functional surfaces 1021, 1022 and 1023 to receive and to further distribute light arriving at the pattern (at an angle of incidence equal to or greater than the critical angle relative to an interface created by any one of said optically functional surfaces).

When a ray of light moves through an optically transparent substrate 100A and strikes one of the internal cavity surfaces (1021, 1022, 1023) at a certain angle, the ray of light is either reflected from the surface back to the substrate or refracted into the cavity at the cavity-substrate interface. The condition according to which the light is reflected or refracted is determined by Snell's law, which gives the relationship between angles of incidence and refraction for a light ray incident on an interface between two media with different indices of refraction. Depending on the wavelength of light, for a sufficiently large incident angle (above the "critical angle") no refraction occurs, and the energy of light is trapped within the substrate.

Critical angle is an incident angle of light relative to the surface normal, at which a phenomenon of the total internal reflection occurs. The angle of incidence becomes a critical angle (i.e. equal to the critical angle), when the angle of refraction is 90 degrees relative to the surface normal. Typically, TIR occurs, when light passes from a medium with high(er) refractive index ($R_i$) to a medium with low(er) $R_i$, for example, from plastic ($R_i$ 1.4-1.6) or glass ($R_i$ 1.5) to the air ($R_i$ 1) or to any other media with essentially low refractive indices. For a light ray travelling from the high $R_i$ medium to the low $R_i$ medium, if the angle of incidence (at a glass-air interface, for example) is greater than the critical angle, then the medium boundary acts as a very good mirror and light will be reflected (back to the high $R_i$ medium, such as glass). When TIR occurs, there is no transmission of energy through the boundary. From the other hand, light incident at angle(s) less than the critical angle, will be partly refracted out of the high $R_i$ medium and partly reflected. The reflected vs refracted light ratio largely depends on the angles of incidence and the refraction indices of the media.

Critical angle varies with a substrate-air interface (e.g. plastic-air, glass-air, etc.). For example, for most plastics and glass critical angle constitutes about 42 degree. Thus, in an exemplary waveguide, light incident at a boundary between a light-transmitting medium, such as a PMMA sheet, and air at an angle of 45 degree (relative to the surface normal), will be probably reflected back to the lightguide medium, thereby, no light out-coupling will occur.

The same principle applies to light travelling, via a series of TIR, through the lightguide medium. We note, that TIR-mediated light propagation through the lightguide, may occur also outside the boundaries defined by the incoupling element 100. TIR phenomenon is established by a lightguide design and/or choice of lightguide media.

Two- or three-dimensional pattern is established, typically with constant periodic pattern features or variable periodic pattern features. Periodicity is a necessary feature to control and deflect a plane wave in the lightguide medium and to redirect the incident light (i.e. light incident on the pattern) for preferred distribution. In additional case, aperiodic pattern features might be utilized for harmonizing non-uniform light flux and/or light distribution.

In each individual pattern, the cavities 102 can be established with discrete- or with at least partly continuous pattern features. Examples of discrete patterns include a dot, a pixel, and the like.

Overall the incoupling element 100 is based on two- and three-dimensional optics utilizing integrated, embedded optic features, such as TIR surface format, periodic grating patterns and hybrid patterns comprising main profiles with optional sub-profiles, embodied as fully embedded cavity optics inside the medium, optionally layers, and the like. The incoupling element solution 100 typically utilizes two- or more optical functions related to at least light propagation, redirecting and transmission, wherein the main optical profile surfaces may optionally include optical sub-features that renders the optical pattern(s) with an additional optical function, such as diffusive-, anti-reflective-, diffractive-, scattering-, beam splitting-, polarizing functions, and the like. Profile form and its function define the final performance target.

FIG. 8A schematically illustrates incoupling solutions implements with a combination of the incoupling element 100 in the form of a taper and the tape 10 assembled on the lightguide 20. Configuration (i) involves the tape 10 comprising the optically functional layer 111 with the pattern 11 laid along a predetermined length of the tape (marked with an arrow). The tape 10 comprises a base adhesive layer (not shown) and a low $R_i$ coating 113 laid along the entire length of the tape. The tape 10 thus contains a region provided with said $R_i$ coating, but void of the pattern 11. Numerical values are given in millimeters (mm).

Configuration (ii) involves a special, segmental tape solution. In the pattern 11 (FIG. 8A, ii), the cavities are configured and arranged such, as to form a substantially variable (or segmental) periodic pattern, wherein each local pattern design has features substantially variable from the other local designs within said pattern. The tape 10 comprises a number of patterns arranged in periodic segments A, B, C, wherein each segment has a predefined area and a length of a period. These local patterns can be rendered variable in terms of modifying pattern- and/or cavity-related parameters, to manage light incident thereto at a predetermined angle or a range of angles. The cavity profiles can be configured variable in terms of a number of parameters selected from any one of: dimensions, shape, cross-sectional profile, orientation and position in the pattern.

In a manner similar to the incoupling element 100, in the tape 10 the cavities are established with two-dimensional- or three-dimensional pattern features having cross-sectional profiles selected from the group consisting of: linear, rectangular, triangular, blazed, slanted, trapezoid, curved, wave-shaped and sinusoidal profiles.

In terms of pattern(s) configuration and arrangement, the tape 10 can be designed and optimized for a certain lightguide thickness and other lightguide-specific parameters.

In the tape 10, a number of patterns, optionally arranged in segments, can be arranged to form a single functional zone (FIG. 8A, i). Alternatively, a number of patterns, optionally arranged in segments, can be arranged such, as to form a number of adjacent functional zones. FIG. 8A configuration (ii) illustrates formation of three (3) functional zones, wherein said functional zones are established with segments A, B, C. In the latter event, each zone or a group of adjacent or non-adjacent zones can have a characteristic cavity profile to efficiently manage light incident at a certain angle.

FIGS. 8B and 8C are comparison graphs illustrative of vertical light distribution (YZ-plane) for a planar lightguide comprising the tapered incoupling element 100 only and the same in combination with the tape 10, accordingly. For the solution of FIG. 8C that utilizes that tape 10, provision of the tape 10 is subsequent to the incoupling element 100, as shown on FIG. 8A (i). Curve 2 is indicative of input light (emitted light prior to being interacted with any optical components); Curve 1 is indicative of output light after being interacted with the optical element 100 and the tape 10. Sum of points for curve 2 (input light) is 100%.

The arrangement of FIG. 8B enables 95.7% efficiency, with FWHM vertical 98°; and the arrangement of FIG. 8C enables 86% efficiency, with FWHM vertical 68°.

From FIG. 8C one may observe that light distribution in the lightguide medium is harmonized by tape 10. More narrow distribution of light incident inside the lightguide improves contrast ratio of the lightguide upon light outcoupling. Transparency on the non-illuminated side of the lightguide is improved, accordingly.

FIG. 9 is a graph illustrative of vertical- (YZ-plane) and horizontal (XZ-plane) light distribution for a planar lightguide comprising the tapered incoupling element 100 in combination with the tape 10, as illustrated on FIG. 5 depicting the taper element 100 with the optical wedge profile 106 on the lightguide contact surface. The element 100 is configured to enable conical collimation by means of embedded cavity pattern 101. The cavity pattern (1011A) is laminated with a specular reflector layer (1011B) on the top of said patterned layer (single side). Additionally, the element comprises an antireflection (AR) coating 1013 on its surface. Curve 2 is indicative of input light (emitted light prior to being interacted with any optical components); Curve 1 is indicative of output light after being interacted with the optical element 100 and the tape 10.

The arrangement enables 78% efficiency, with FWHM horizontal 29° and FWHM vertical 60°.

FIGS. 10A and 10B illustrate the effects related to illuminance (internal intensity) distribution inside the lightguide medium 20 and attainable by light-incoupling solution involving a tapered element 100 without collimation pattern(s) and the same with collimation pattern(s). The collimating taper 100 (FIG. 10B) is implemented in accordance to what is shown on FIG. 4 (position of the cavity pattern 101 in the element 100 is shown by dashed box). Both solutions utilize the tape 10 placed subsequently to the element 100. Both solutions employ a Lambertian light source 30.

The arrangement of FIG. 10A enables 81% efficiency, with FWHM horizontal 73° and FWHM vertical 77°. The arrangement of FIG. 10B (involving collimation optics) enables 82% efficiency, with FWHM horizontal 47° and FWHM vertical 72°.

The description above has referred to the incoupling element 100 provided as a discrete three-dimensional object/a profile with a predetermined shape and measurable in three different dimensions/directions (length, width and height/thickness).

In some configurations, the optical incoupling element 100 can be provided in the form of a narrow, elongated entity, such as a band or a strip. The element configured as a strip may can be further provided in the form of a roll, e.g. rolled around a reel, for example. Production of such roll is enabled by roll-to-roll lamination processes.

A light incoupling unit 250 incorporating the element 100 in the form of such elongated strip and at least one emitter device 30 can be conceived, accordingly (see FIG. 11, A, B, C).

FIG. 11 illustrates different lightguide solutions (viewed from the top) with assembled light incoupling units. Configuration A shows light incoupling by the element 100 or the unit 250 on an upper (top) side of a window (lightguide medium 20) with one-directional light propagation. Configuration B shows light incoupling by the element 100 or the unit 250 on an upper (top) and lower (bottom) sides of the window, as well as in the middle of the window, with one- and bi-directional light propagation. The unit 250 in the middle may utilize an incoupling element solution according to FIG. 2B, for example. Configuration C shows light incoupling by the element 100 or the unit 250 on left- and right sides of the window with one-directional light propagation.

Configuration D, in turn, illustrates the incoupling element 100 provided as a part of a discrete, essentially circular-shaped unit 250 placed in the central area of the window and configured for multidirectional light propagation. Such configuration enables 360° light emission and propagation. The unit 250 may dome-shaped, for example.

The incoupling element 100 optionally provided as a part of the incoupling unit 250 is easy and fast to install. The element 100 may be configured as a flexible (viz. bendable) strip rolled on the reel or a durable profile with a predetermined length for different targets.

In another aspect, the invention concerns a method for manufacturing the optical incoupling element 100 provided in the form of a discrete, optically functional item comprising a substrate and at least one three-dimensionally formed optical surface with at least one pattern formed in the substrate, said method comprises: manufacturing a master tool for the pattern by a suitable fabrication method and transferring the pattern onto the element substrate to generate a patterned substrate.

The pattern can be fabricated by any suitable method, including, but not limited to: lithographic, three-dimensional printing, micro-machining, laser engraving, or any combination thereof. Other appropriate methods may be utilized.

In some configurations, the method further comprises generating an embedded cavity pattern or patterns by applying, onto said patterned substrate, an additional flat, planar substrate layer, such that internal cavities are formed at a fully flat, planar interface between the substrate layers.

In some instances, the embedded cavity pattern or patterns is/are generated by roll lamination methods, such as roll-to-roll lamination, wherein sublayers 1011A, 1011B are laminated against one another to form the optically functional layer 1011. The substrate layers 1011A, 1011B can be joined by a lamination method selected from any one of: a roll-to-roll lamination, a roll-to-sheet lamination or a sheet-to-sheet lamination. Roll lamination is particularly applicable for manufacturing flexible element solutions, such as elongated strip-like solutions.

Once fabricated pattern is advantageously further replicated by any suitable method, such imprinting, extrusion replication or three-dimensional printing. Any other appropriate method may be utilized.

Typical production line is adopted to perform the following processes: a) pattern fabrication and replication; b) cavity lamination; c) preparation of other/additional layer(s) and lamination thereof; and d) final film cutting. The production line can be further adopted for manufacturing narrow- or wide tape products.

The invention further pertains to provision of a lightguide comprising an optically transparent medium 20 configured to establish a path for light propagation through the lightguide, and the optical incoupling element 100 and/or the optical uncoupling unit 250, implemented according to the embodiments described hereinabove, wherein the optical incoupling element and/or the unit is attached onto at least one planar surface of said lightguide. In some configurations, the optical incoupling element/unit is attached to the lightguide by adhesion.

A use of said lightguide in illumination and/or indication is further provided. The lightguide can be used for the illumination and indication related purposes including, but not limited to: of decorative illumination, light shields and masks, public and general illumination, including window, facade and roof illumination, signage-, signboard-, poster- and/or an advertisement board illumination and indication, and in solar applications.

It is clear to a person skilled in the art that with the advancement of technology the basic ideas of the present invention are intended to cover various modifications thereof. The invention and its embodiments are thus not limited to the examples described above; instead they may generally vary within the scope of the appended claims.

REFERENCES

1. Bernard C. Kress, "Optical waveguide combiners for AR headsets: features and limitations", Proc. SPIE 11062, Digital Optical Technologies 2019, 110620J (16 Jul. 2019).
2. Moon et al, "Microstructured void gratings for outcoupling deep-trap guided modes," Opt. Express 26, A450-A461 (2018).
3. Carlos Angulo Barrios and Victor Canalejas-Tejero, "Light coupling in a Scotch tape waveguide via an integrated metal diffraction grating," Opt. Lett. 41, 301-304 (2016).

The invention claimed is:

1. An optical incoupling element for a lightguide, wherein the optical incoupling element is a discrete, optically functional member that comprises:
    a substrate, and
    at least one three-dimensionally formed optical surface,
        wherein the at least one three-dimensionally formed optical surface is configured to incouple light incident thereto and to adjust a direction of the incoupled light transmitted through an optical contact surface established at an interface between the substrate and a lightguide medium such that the incoupled light acquires a propagation path through the lightguide medium via a series of total internal reflections,
        wherein the optical incoupling element is configured to receive light onto the at least one three-dimensionally formed optical surface from a direction essentially parallel to a longitudinal plane of the lightguide medium, whereupon essentially all light emitted by an emitter device enters into the optical incoupling element and essentially all light received by the optical incoupling element is incoupled into the lightguide medium,
        wherein the optical incoupling element is attachable onto at least one planar surface of the lightguide medium, and
    at least one optical pattern formed with optically functional cavities fully embedded in the substrate and filled with a material having a refractive index different from a refractive index of the material of the substrate surrounding the optically functional cavities.

2. The optical incoupling element of claim 1, wherein the at least one optical pattern is configured to incouple light incident thereto and to redirect incoupled light at an interface between each of the optically functional cavities and the material of the substrate surrounding each of the optically functional cavities such that the incoupled light acquires the propagation path through the lightguide medium, whereupon an angle of incidence at an interface between the lightguide medium and the ambient, and an angle of incidence at the interface between each of the optically functional cavities and the material of the substrate surrounding each of the optically functional cavities is/are larger than or equal to a critical angle of total internal reflection.

3. A method for manufacturing an optical incoupling element provided in the form of a discrete, optically functional member that comprises a substrate and at least one three-dimensionally formed optical surface with at least one pattern formed in the substrate, the method comprises:

manufacturing a master tool for the at least one pattern by a fabrication method selected from any one of: lithographic, three-dimensional printing, micro-machining, laser engraving, or any combination thereof;

transferring the at least one pattern onto the substrate to generate the at least one three-dimensionally formed optical surface with a predetermined optical function, wherein the at least one pattern is configured to incouple light incident thereto and to adjust direction of the incoupled light transmitted through an optical contact surface established at an interface between the substrate and a lightguide medium such that the incoupled light acquires a propagation path through a lightguide medium via a series of total internal reflections, and wherein the optical incoupling element is configured to receive light onto the at least one pattern from a direction essentially parallel to a longitudinal plane of the lightguide medium, whereupon essentially all light emitted by an emitter device enters into the optical incoupling element and essentially all light received by the incoupling element is incoupled into the lightguide medium; and applying an additional substrate layer onto the at least one pattern by a lamination method selected from any one of: a roll-to-roll lamination, a roll-to-sheet lamination or a sheet-to-sheet lamination, to generate an embedded cavity pattern or patterns.

4. The method of claim 3, further comprising replication of a fabricated pattern, wherein pattern replication method is selected from any one of imprinting, extrusion replication or three-dimensional printing.

5. An optical incoupling element for a lightguide, wherein the optical incoupling element is a discrete, optically functional member that comprises:

a substrate, and at least one three-dimensionally formed optical surface, wherein the at least one three-dimensionally formed optical surface is configured to incouple light incident thereto and to adjust a direction of the incoupled light transmitted through an optical contact surface established at an interface between the substrate and a lightguide medium such that the incoupled light acquires a propagation path through the lightguide medium via a series of total internal reflections, wherein the optical incoupling element is configured to receive light onto the at least one three-dimensionally formed optical surface from a direction essentially parallel to a longitudinal plane of the lightguide medium, whereupon essentially all light emitted by an emitter device enters into the optical incoupling element and essentially all light received by the optical incoupling element is incoupled into the lightguide medium, wherein the optical incoupling element is attachable onto at least one planar surface of the lightguide medium, and at least one optical pattern established with a number of periodic pattern features formed in the substrate and configured as optically functional cavities.

6. The optical incoupling element of claim 5, wherein light emitted from the emitter device enters to the optical incoupling element and does not enter to an edge of the lightguide medium.

7. The optical incoupling element of claim 5, wherein the at least one three-dimensionally formed optical surface and the at least one cavity pattern are configured to perform an optical function related to incoupling and adjusting the direction of light received thereto, wherein the optical function is selected from a group consisting of: a reflection function, an absorption function, a transmittal function, a collimation function, a refraction function, a diffraction function, a polarization function, and any combination thereof.

8. The optical incoupling element of claim 5, wherein each of the optically functional cavities in the pattern has a number of optically functional surfaces.

9. The optical incoupling element of claim 8, wherein the optically functional surfaces are established by any surfaces formed at the interface between each of the optically functional cavities and the material of the substrate surrounding each of the optically functional cavities.

10. The optical incoupling element of claim 5, in which the three-dimensionally formed optical surface and/or the optically functional surface or surfaces formed in the at least one optical pattern comprise any one of a low refractive index reflector, a polarizer, a diffuser, an absorber, or any combination thereof.

11. The optical incoupling element of claim 5, wherein the at least one optical pattern is configured to perform at least one optical function by virtue of adjusting a number of parameters related to a cavity or a group of cavities in the at least one optical pattern, wherein the number of parameters comprises an individual parameter or any combination of parameters selected from the group consisting of: dimensions, shape, cross-sectional profile, orientation, periodicity, and fill factor.

12. The optical incoupling element of claim 5, wherein the optically functional cavities are configured and arranged in the at least one optical pattern so as to form a substantially variable periodic pattern.

13. The optical incoupling element of claim 5, wherein the optically functional cavities are configured and arranged in the at least one optical pattern so as to form a substantially constant periodic pattern.

14. The optical incoupling element of claim 5, wherein, in the at least one optical pattern, the optically functional cavities are established with discrete or at least partly continuous pattern features.

15. The optical incoupling element of claim 5, wherein the optically functional cavities are established with two-dimensional or three-dimensional pattern features having cross-sectional profiles selected from the group consisting of: linear, rectangular, triangular, blazed, slanted, trapezoid, curved, wave-shaped and sinusoidal profiles.

16. The optical incoupling element of claim 5, the substrate comprising at least two substrate components, wherein at least one cavity pattern is formed in an essentially flat, planar surface of any one of the at least two substrate components, whereby one of the at least two substrate components is a substrate component with a patterned surface that is established and brought against an entirely flat, planar surface of another of the at least two substrate components so that the at least one optical pattern having the optically functional cavities alternating with flat junction areas is formed at an interface between the patterned surface and the entirely flat, planar surface of the at least two substrate components.

17. The optical incoupling element of claim 16, wherein the component of the substrate has with the entirely flat, planar substrate surface made of any one of: an optically transparent material, a coloured material, a reflector material, and a combination thereof.

18. The optical incoupling element of claim 5, wherein the substrate or at least a component of the substrate has a patterned surface made of substantially optically transparent material.

19. The optical incoupling element of claim 5, wherein the optically functional cavities are filled with a gaseous material.

20. The optical incoupling element of claim 1, wherein the at least one optical pattern comprises a number of embedded cavity patterns arranged in a stacked configuration and provided as the optically functional cavities.

21. The optical incoupling element of claim 5, comprising a lightguide attachment surface, wherein the lightguide attachment surface is an adhesion layer.

22. The optical incoupling element of claim 21, in which at least a portion of the external surface of the optical incoupling element laid essentially opposite to the lightguide attachment surface is configured tapered relative to the longitudinal plane of the lightguide medium.

23. The optical incoupling element of claim 21, wherein the at least one optical pattern comprises at least one embedded pattern arranged on a plane defined by a surface of the element laid essentially opposite to the lightguide attachment surface.

24. The optical incoupling element of claim 5, wherein the at least one optical pattern comprises at least one embedded pattern arranged on a plane defined by a surface of the element essentially perpendicular relative to the longitudinal plane of the lightguide medium and facing the emitter device.

25. The optical incoupling element of claim 5, comprising at least two adjacent functional zones independently configured to perform the optical function related to incoupling light incident thereto and adjusting direction of the incoupled light such that the incoupled light is (re) directed into the lightguide medium.

26. The optical incoupling element of claim 25, wherein the at least two adjacent functional zones are formed by separate element modules interconnected by an interfacial layer.

27. The optical incoupling element of claim 5, provided in the form of an elongated strip.

28. The optical incoupling element of claim 5, further comprising a wavelength conversion layer.

29. An arrangement comprising at least two incoupling elements arranged on the lightguide medium, wherein each element is the optical incoupling element as defined in claim 5.

30. The optical incoupling element of claim 5, wherein the incoupled light is redirected at an interface between the three-dimensionally formed optical surface and the ambient and/or at the interface between the element-substrate and the lightguide medium to acquire the propagation path through the lightguide medium, whereupon an angle of incidence at an interface between the lightguide medium and the ambient is/are larger than or equal to a critical angle of total internal reflection.

31. A lightguide, comprising an optically transparent medium configured to establish a path for light propagation through a lightguide medium, and at least one optical incoupling element, as defined in claim 5, wherein the at least one optical incoupling element is attachable onto at least one planar surface of the lightguide medium.

32. The lightguide of claim 31, wherein the at least one optical incoupling element is attached to the at least one planar surface of the lightguide medium by adhesion.

33. An optical unit, comprising at least one optical incoupling element with an adhesion layer for a lightguide attachment and at least one emitter device, wherein the at least one optical incoupling element is configured as defined in claim 5.

34. The optical unit of claim 33, wherein the at least one emitter device is at least partly integrated inside the substrate material forming the at least one optical incoupling element.

35. The optical unit of claim 33, wherein the at least one emitter device is selected from a group consisting of: a Light Emitting Diode (LED), an Organic Light Emitting Diode (OLED), a laser diode, a LED bar, an OLED strip, a microchip LED strip, and a cold cathode tube.

36. The optical unit of claim 33, comprising at least one light emitter device configured for emitting monochromic light, and the optical incoupling element that comprises the wavelength conversion layer.

* * * * *